(12) United States Patent
Taniai et al.

(10) Patent No.: US 12,735,070 B2
(45) Date of Patent: Sep. 15, 2026

(54) TRANSPORT SYSTEM, TRANSPORT CONTROL METHOD, AND STORAGE MEDIUM

(71) Applicant: TOYOTA JIDOSHA KABUSHIKI KAISHA, Toyota (JP)

(72) Inventors: Osamu Taniai, Okazaki (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 18/197,762

(22) Filed: May 16, 2023

(65) Prior Publication Data

US 2024/0010240 A1 Jan. 11, 2024

(30) Foreign Application Priority Data

Jul. 5, 2022 (JP) ................................ 2022-108329

(51) Int. Cl.
*B60W 60/00* (2020.01)
*G06Q 10/047* (2023.01)
*G06Q 10/083* (2024.01)
*G06Q 30/0645* (2023.01)

(52) U.S. Cl.
CPC ..... *B60W 60/00256* (2020.02); *G06Q 10/047* (2013.01); *G06Q 10/0838* (2013.01); *G06Q 30/0645* (2013.01)

(58) Field of Classification Search
None
See application file for complete search history.

(56) References Cited

U.S. PATENT DOCUMENTS 10,556,334 B1 * 2/2020 Theobald ................... B25J 9/00
11,301,800 B1 * 4/2022 Bhagwat .............. G06K 7/1413
2008/0288321 A1 * 11/2008 Dillon ................ G05B 23/0283 705/7.13
2010/0234995 A1 * 9/2010 Zini ....................... B25J 11/009 700/258

(Continued)

FOREIGN PATENT DOCUMENTS

CN 104584367 A * 4/2015 .............. B60L 53/53
EP 3904152 A1 * 11/2021 .............. B60L 53/14

(Continued)

*Primary Examiner* — Mahmoud S Ismail
*Assistant Examiner* — Jacob Daniel Underbakke
(74) *Attorney, Agent, or Firm* — Oliff PLC

(57) ABSTRACT

The transportation system stores a learned model that is machine-learned so as to output a collection route that is collected by the mobile robot by inputting an end-of-use prediction result that is a result of predicting an end-of-use time of the device being lent, using learning data including collection result data indicating a collection result including a use end time at which the use of the device has ended and a collection completion time collected as a return product, and collection route data indicating a collection route collected by the mobile robot by using the device as a return product. The transport system inputs the end time prediction result to the learned model, acquires a collection route to be collected by the mobile robot using the equipment being lent as a returned item, and determines a mobile robot to be collected by the acquired collection route.

15 Claims, 14 Drawing Sheets

(56) References Cited

U.S. PATENT DOCUMENTS

| | | | | |
|---|---|---|---|---|
| 2010/0241751 | A1* | 9/2010 | Sonoda | G06Q 10/06 709/226 |
| 2014/0337040 | A1* | 11/2014 | Debusk | G06Q 10/10 705/2 |
| 2016/0148302 | A1* | 5/2016 | Carr | G06Q 30/0635 705/26.81 |
| 2017/0124289 | A1* | 5/2017 | Hasan | G16H 10/60 |
| 2017/0193417 | A1* | 7/2017 | Syed | G06Q 10/087 |
| 2018/0218466 | A1* | 8/2018 | Mowatt | G06Q 30/0635 |
| 2019/0236741 | A1* | 8/2019 | Bowman | G05D 1/692 |
| 2019/0361463 | A1* | 11/2019 | Nelson | G06F 16/9537 |
| 2020/0349511 | A1* | 11/2020 | Seaver | G06Q 10/06312 |
| 2020/0393260 | A1* | 12/2020 | Falck | G06Q 10/08355 |
| 2021/0102817 | A1* | 4/2021 | Kim | G06Q 10/06315 |
| 2021/0142248 | A1* | 5/2021 | Balva | G08G 1/202 |
| 2021/0256472 | A1* | 8/2021 | Javidan | H04W 4/025 |
| 2022/0129849 | A1* | 4/2022 | Mimassi | G06Q 10/08 |
| 2022/0359064 | A1* | 11/2022 | Pierson | G16H 40/40 |

FOREIGN PATENT DOCUMENTS

| | | | | |
|---|---|---|---|---|
| JP | 2017138754 | A * | 8/2017 | |
| JP | 2021-140273 | A | 9/2021 | |
| WO | WO-2021148697 | A1 * | 7/2021 | G06Q 10/087 |

* cited by examiner 1
30
EQUIPMENT LENDING SYSTEM
10
UPPER MANAGEMENT DEVICE
40
ELECTRONIC MEDICAL CHART SYSTEM
600
610
610
400
U1
20
27, 28
24
25
26
24
25
400
U2

FIG. 5

| MEDICAL RECORD ID | PATIENT ID | PATIENT NAME | NAME OF DISEASE | LINK FOR DISEASE IMAGES | ACTION | NEED FOR HOSPITALIZATION | DISPOSAL SITE | TREATMENT START TIME | TREATMENT END TIME | PLANNED TREATMENT PERSONNEL |
|---|---|---|---|---|---|---|---|---|---|---|
| 001 | P001 | ... | DIABETES | ... | INSULIN MEDICATION | REQUIRED | G001 | 13:00 | 15:30 | U001 |
| 002 | P002 | ... | LUNG CANCER | ... | ANTI-CANCER DRUG ADMINISTRATION | REQUIRED | G002 | 13:50 | 14:00 | U002 |
| ... | ... | ... | ... | ... | ... | ... | ... | ... | ... | ... |

FIG. 6

| LENDING CONTROL NUMBER | DEVICE CONTROL NUMBER | NAME | NECESSITY OF MAINTE-NANCE | MECHANIC TYPE | TRANSPORT DESTINATION (PLACE OF USE) | PROSPEC-TIVE USERS | START TIME OF USE | END OF USE TIME | OFFICIAL/ TEMPORARY RESERVATIONS |
|---|---|---|---|---|---|---|---|---|---|
| 001 | E001 | SYRINGE PUMP | RE-QUIRED | MA001 | G001 | U001 | 13:00 | 15:30 | OFFICIAL |
| 002 | E002 | INFUSION PUMP | RE-QUIRED | MA002 | G001 | U002 | 13:50 | 14:00 | OFFICIAL |
| 003 | E003 | TRANS-FUSION PUMP | RE-QUIRED | MA001 | G002 | U004 | 16:00 | 18:30 | PRELIMINARY RESERVATION |
| ⋮ | ⋮ | ⋮ | ⋮ | ⋮ | ⋮ | ⋮ | ⋮ | ⋮ | ⋮ |

FIG. 7

| TRANSPORT CONTROL NUMBER | DEVICE CONTROL NUMBER | NAME | NECESSITY OF MAINTE-NANCE | MECHANIC TYPE | TRANS-PORT SOURCE | TRANS-PORT DESTI-NATION | PROSPEC-TIVE USERS | ROBOTIC ID | STATUS | START TIME OF USE | END OF USE TIME |
|---|---|---|---|---|---|---|---|---|---|---|---|
| 001 | E001 | SYRINGE PUMP | RE-QUIRED | MA001 | S001 | G001 | U001 | AAA | TRANSPORTED | 13:00 | 15:30 |
| 002 | E002 | INFUSION PUMP | RE-QUIRED | MA002 | S001 | G001 | U002 | BBB | TRANSPORTING | 13:50 | 14:00 |
| ⋮ | ⋮ | ⋮ | ⋮ | ⋮ | ⋮ | ⋮ | ⋮ | ⋮ | ⋮ | ⋮ | ⋮ |

FIG. 11

| MOBILE ROBOT α, DEPARTURE TIME 2021/10/05 16:00 | | | |
|---|---|---|---|
| OPERATION | POINT | START TIME (ESTIMATED) | DURATION [MIN] (ESTIMATED) |
| MOVE | CURRENT LOCATION => WARD A | 2021/10/05 16:00 | 7 |
| COLLECTION | WARD A | 2021/10/05 16:07 | 5 |
| MOVE | WARD A => WARD B | 2021/10/05 16:12 | 4 |
| COLLECTION | WARD B | 2021/10/05 16:16 | 6 |
| MOVE | WARD B => RETURN LOCATION | 2021/10/05 16:22 | 10 |

TRANSPORT SYSTEM, TRANSPORT CONTROL METHOD, AND STORAGE MEDIUM

CROSS-REFERENCE TO RELATED APPLICATION

This application claims priority to Japanese Patent Application No. 2022-108329 filed on Jul. 5, 2022, incorporated herein by reference in its entirety.

BACKGROUND

1. Technical Field

The present disclosure relates to a transport system, a transport control method, and a storage medium.

2. Description of Related Art

Japanese Unexamined Patent Application Publication No. 2021-140273 (JP 2021-140273 A) discloses an information processing device that adjusts a distribution base in accordance with a demand prediction. The information processing device generates product demand information indicating a trend of a demand for a product for each region based on a place where an action of each user related to the product is performed and a number of actions performed at the place, and determines a distribution base of the product based on the product demand information. Further, the information processing device creates a transportation plan for transporting the product to the distribution base of the product in advance based on the product demand information. Furthermore, the information processing device creates an inventory conveyance plan for transferring the inventory of the product to the distribution base of the product in advance from another distribution base where the product is in stock based on the product demand information.

SUMMARY

In a device lending system that lends out devices, a situation occurs in which inventory is insufficient in a case where a lending demand for devices rapidly increases and the like. One factor that leads to a shortage of inventory of lending devices or a problem in the management of the lending devices is that even after the use of the devices is completed at the lending destination, the return transportation is determined by the staff at the lending destination, generating a stay time. The reason why the determination is made by the staff at the lending destination is that, for example, when the device is a medical device, there are situations where loading can be carried out immediately and situations where loading cannot be carried out immediately due to a shortage of personnel or the presence of an emergency patient, etc. depending on the ward.

Therefore, it is desired to shorten such a stay time as much as possible. In particular, when a mobile robot is used to collect a returned article, it is desired to suppress deterioration of the mobile robot as much as possible and achieve power saving. In the technology described in JP 2021-140273 A, these problems cannot be solved even when a lending device is applied instead of a product.

The present disclosure has been made to solve such problems, and provides a transport system, a transport control method, a learned model, and a storage medium capable of efficiently suppressing a stay time from the end of use to the completion of return by a mobile robot of a device to be lent in a device lending system, and a learning system, a learning method, and a storage medium capable of generating such a learned model.

A transport system according to the present disclosure is a transport system for transporting, with a mobile robot, a device to be lent in a device lending system. The transport system: uses learning data including collection record data and collection route data, the collection record data being data indicating a collection record including a use end time at which use of the device ended and a collection completion time at which the device was collected as a returned article after lending out the device, and the collection route data being data indicating a collection route along which the mobile robot collected the device, to store a learned model that has undergone machine learning so as to output a collection route along which the mobile robot collects the device that is being lent as the returned article by inputting an end time prediction result that is a result of predicting the use end time of the device that is being lent; inputs the end time prediction result that is the result of predicting the use end time of the device that is being lent to the learned model to acquire the collection route along which the mobile robot collects the device that is being lent as the returned article; and determines the mobile robot to perform collection along the acquired collection route. In the above-described transport system, with such a configuration, a collection route considering past collection record data is acquired from a prediction result of the use end time of the lent device, and a mobile robot serving as a collector is determined. Therefore, in the above-described transport system, the device can be collected along an efficient collection route, and as a result, the stay time from the end of use of the device to the completion of the return by the mobile robot can be efficiently suppressed.

The learned model may be a model that has undergone machine learning so as to output the collection route that allows collecting a plurality of the devices. Thus, in the above-described transport system, since an efficient collection route for collecting a plurality of devices can be acquired, it is possible to more efficiently suppress the stay time from the end of use of the plurality of devices to the completion of the return by the mobile robot.

The collection record data may include first information that is at least one of a time required by the mobile robot to perform the collection, a moving distance of the mobile robot, and power consumption of the mobile robot. The learned model may be a model that has undergone machine learning so as to output the collection route so as to minimize the first information. In the above-described transport system, with such a configuration, a collection route considering past collection record data including the above first information is acquired from a prediction result of the use end time of the lent device, and a mobile robot serving as a collector is determined. Therefore, in the above-described transport system, it is possible to collect the device along a collection route that can be considered efficient in terms of at least one of the time, the moving distance, and the power consumption, and as a result, it is possible to efficiently suppress the stay time from the end of use of the device to the completion of the return by the mobile robot from the above-described viewpoint.

The collection record data may include first information that is at least one of a time required by the mobile robot to perform the collection, a moving distance of the mobile robot, and power consumption of the mobile robot. The learned model may be a model that has undergone machine learning so as to output the collection route for collecting the devices so as to minimize the first information, when a collectable time at a collection point for the devices is within a predetermined time. In the above-described transport system, with such a configuration, a collection route capable of collecting a plurality of devices considering past collection record data including the above first information is acquired from a prediction result of the use end time of the lent device, and a mobile robot serving as a collector is determined. Therefore, in the above-described transport system, it is possible to collect a plurality of devices along a collection route that can be considered efficient in terms of at least one of the time, the moving distance, and the power consumption, and as a result, it is possible to efficiently suppress the stay time from the end of use of the devices to the completion of the return by the mobile robot from the above-described viewpoint.

The device may be a medical device. Accordingly, in the above-described transport system, it is possible to efficiently suppress the stay time from the end of use of the medical device to the completion of the return by the mobile robot in consideration of the usage form of the medical device.

A transport control method according to the present disclosure is a transport control method for a computer to perform transport control for transporting, with a mobile robot, a device to be lent in a device lending system. The transport control method includes: using, by the computer, learning data including collection record data and collection route data, the collection record data being data indicating a collection record including a use end time at which use of the device ended and a collection completion time at which the device was collected as a returned article after lending out the device, and the collection route data being data indicating a collection route along which the mobile robot collected the device, to store a learned model that has undergone machine learning so as to output a collection route along which the mobile robot collects the device that is being lent as the returned article by inputting an end time prediction result that is a result of predicting the use end time of the device that is being lent; inputting, by the computer, the end time prediction result that is the result of predicting the use end time of the device that is being lent to the learned model to acquire the collection route along which the mobile robot collects the device that is being lent as the returned article; and determining, by the computer, the mobile robot to perform collection along the acquired collection route. In the above-described transport control method, with such processes, a collection route considering past collection record data is acquired from a prediction result of the use end time of the lent device, and a mobile robot serving as a collector is determined. Therefore, in the above-described transport control method, control can be performed so that the device is collected along an efficient collection route, and as a result, the stay time from the end of use of the device to the completion of the return by the mobile robot can be efficiently suppressed.

The learned model may be a model that has undergone machine learning so as to output the collection route that allows collecting a plurality of the devices. Thus, in the above-described transport control method, since an efficient collection route for collecting a plurality of devices can be acquired, it is possible to more efficiently suppress the stay time from the end of use of the plurality of devices to the completion of the return by the mobile robot.

The collection record data may include first information that is at least one of a time required by the mobile robot to perform the collection, a moving distance of the mobile robot, and power consumption of the mobile robot. The learned model may be a model that has undergone machine learning so as to output the collection route so as to minimize the first information. In the above-described transport control method, with such processes, a collection route considering past collection record data including the above first information is acquired from a prediction result of the use end time of the lent device, and a mobile robot serving as a collector is determined. Therefore, in the above-described transport control method, it is possible to perform control so as to collect the device along a collection route that can be considered efficient in terms of at least one of the time, the moving distance, and the power consumption, and as a result, it is possible to efficiently suppress the stay time from the end of use of the device to the completion of the return by the mobile robot from the above-described viewpoint.

The collection record data may include first information that is at least one of a time required by the mobile robot to perform the collection, a moving distance of the mobile robot, and power consumption of the mobile robot. The learned model may be a model that has undergone machine learning so as to output the collection route for collecting the devices so as to minimize the first information, when a collectable time at a collection point for the devices is within a predetermined time. In the above-described transport control method, with such processes, a collection route capable of collecting a plurality of devices considering past collection record data including the above first information is acquired from a prediction result of the use end time of the lent device, and a mobile robot serving as a collector is determined. Therefore, in the above-described transport control method, it is possible to perform control so as to collect a plurality of devices along a collection route that can be considered efficient in terms of at least one of the time, the moving distance, and the power consumption, and as a result, it is possible to efficiently suppress the stay time from the end of use of the devices to the completion of the return by the mobile robot from the above-described viewpoint.

The device may be a medical device. Accordingly, in the above-described transport control method, it is possible to efficiently suppress the stay time from the end of use of the medical device to the completion of the return by the mobile robot in consideration of the usage form of the medical device.

In a storage medium according to the present disclosure, a program causes a computer to execute transport control for transporting, with a mobile robot, a device to be lent in a device lending system. The transport control includes: using learning data including collection record data and collection route data, the collection record data being data indicating a collection record including a use end time at which use of the device ended and a collection completion time at which the device was collected as a returned article after lending out the device, and the collection route data being data indicating a collection route along which the mobile robot collected the device, and inputting an end time prediction result that is a result of predicting the use end time of the device that is being lent to a learned model that has undergone machine learning so as to output a collection route along which the mobile robot collects the device that is being lent as the returned article by inputting the end time prediction result that is the result of predicting the use end time of the device that is being lent, to acquire the collection route along which the mobile robot collects the device that is being lent as the returned article; and determining the mobile robot to perform collection along the acquired collection route. In the above-described program, with such processes, a collection route considering past collection record data is acquired from a prediction result of the use end time of the lent device, and a mobile robot serving as a collector is determined. Therefore, in the above-described program, control can be performed so that the device is collected along an efficient collection route, and as a result, the stay time from the end of use of the device to the completion of the return by the mobile robot can be efficiently suppressed.

The learned model may be a model that has undergone machine learning so as to output the collection route that allows collecting a plurality of the devices. Thus, in the above-described program, since an efficient collection route for collecting a plurality of devices can be acquired, it is possible to more efficiently suppress the stay time from the end of use of the plurality of devices to the completion of the return by the mobile robot.

The collection record data may include first information that is at least one of a time required by the mobile robot to perform the collection, a moving distance of the mobile robot, and power consumption of the mobile robot. The learned model may be a model that has undergone machine learning so as to output the collection route so as to minimize the first information. In the above-described program, with such processes, a collection route considering past collection record data including the above first information is acquired from a prediction result of the use end time of the lent device, and a mobile robot serving as a collector is determined. Therefore, in the above-described program, it is possible to perform control so as to collect the device along a collection route that can be considered efficient in terms of at least one of the time, the moving distance, and the power consumption, and as a result, it is possible to efficiently suppress the stay time from the end of use of the device to the completion of the return by the mobile robot from the above-described viewpoint.

The collection record data may include first information that is at least one of a time required by the mobile robot to perform the collection, a moving distance of the mobile robot, and power consumption of the mobile robot. The learned model may be a model that has undergone machine learning so as to output the collection route for collecting the devices so as to minimize the first information, when a collectable time at a collection point for the devices is within a predetermined time. In the above-described program, with such processes, a collection route capable of collecting a plurality of devices considering past collection record data including the above first information is acquired from a prediction result of the use end time of the lent device, and a mobile robot serving as a collector is determined. Therefore, in the above-described program, it is possible to perform control so as to collect a plurality of devices along a collection route that can be considered efficient in terms of at least one of the time, the moving distance, and the power consumption, and as a result, it is possible to efficiently suppress the stay time from the end of use of the devices to the completion of the return by the mobile robot from the above-described viewpoint.

The device may be a medical device. Accordingly, in the above-described program, it is possible to efficiently suppress the stay time from the end of use of the medical device to the completion of the return by the mobile robot in consideration of the usage form of the medical device.

A learned model according to the present disclosure is a learned model that has undergone machine learning so as to output a collection route along which a mobile robot collects a device that is to be lent in a device lending system and that is being lent as a returned article by inputting an end time prediction result that is a result of predicting a use end time of the device that is being lent, using learning data including collection record data and collection route data, the collection record data being data indicating a collection record including the use end time at which use of the device ended and a collection completion time at which the device was collected by the mobile robot as the returned article after lending out the device, and the collection route data being data indicating the collection route along which the mobile robot collected the device. In the above-described learned model, with such a configuration, a collection route considering past collection record data is acquired from a prediction result of the use end time of the lent device. Therefore, in the above-described learned model, it is possible to acquire a collection route that efficiently suppresses the stay time from the end of use of the device to the completion of the return by the mobile robot.

A learning system according to the present disclosure is a learning system that inputs learning data including collection record data and collection route data, the collection record data being data indicating a collection record including a use end time at which use of a device that is to be lent in a device lending system ended and a collection completion time at which the device was collected by a mobile robot as a returned article after lending out the device, and the collection route data being data indicating a collection route along which the mobile robot collected the device, to a non-learned learning model and executes machine learning to generate a learned model that outputs a collection route along which the mobile robot collects the device that is being lent as the returned article by inputting an end time prediction result that is a result of predicting the use end time of the device that is being lent. With such a configuration, the above-described learning system can generate a learned model capable of acquiring a collection route that efficiently suppresses the stay time from the end of use of the device to the completion of the return by the mobile robot.

A learning method according to the present disclosure includes inputting learning data including collection record data and collection route data, the collection record data being data indicating a collection record including a use end time at which use of a device that is to be lent in a device lending system ended and a collection completion time at which the device was collected by a mobile robot as a returned article after lending out the device, and the collection route data being data indicating a collection route along which the mobile robot collected the device, to a non-learned learning model and executing machine learning to generate a learned model that outputs a collection route along which the mobile robot collects the device that is being lent as the returned article by inputting an end time prediction result that is a result of predicting the use end time of the device that is being lent. In the above-described learning method, with such processes, a learned model capable of acquiring a collection route that efficiently suppresses the stay time from the end of use of the device to the completion of the return by the mobile robot can be generated.

In a storage medium according to the present disclosure, a program causes a computer to execute a learning process including inputting learning data including collection record data and collection route data, the collection record data being data indicating a collection record including a use end time at which use of a device that is to be lent in a device lending system ended and a collection completion time at which the device was collected by a mobile robot as a returned article after lending out the device, and the collection route data being data indicating a collection route along which the mobile robot collected the device, to a non-learned learning model and executing machine learning to generate a learned model that outputs a collection route along which the mobile robot collects the device that is being lent as the returned article by inputting an end time prediction result that is a result of predicting the use end time of the device that is being lent. In the above-described program, with such processes, a learned model capable of acquiring a collection route that efficiently suppresses the stay time from the end of use of the device to the completion of the return by the mobile robot can be generated.

The present disclosure can provide a transport system, a transport control method, a learned model, and a storage medium capable of efficiently suppressing a stay time from the end of use to the completion of return by a mobile robot of a device to be lent in a device lending system, and a learning system, a learning method, and a storage medium capable of generating such a learned model.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a table showing an example of electronic medical record information stored in the electronic medical record system of FIG. 4;

FIG. 6 is a table illustrating an example of device lending information and temporary reservation information stored in the device lending system of FIG. 3;

FIG. 7 is a table showing an example of the conveyed object information stored in the upper management device of FIG. 2;

FIG. 11 is a diagram illustrating an example of a collection route acquired in the transport process of FIG. 10;

DETAILED DESCRIPTION OF EMBODIMENTS

Hereinafter, the present disclosure will be described through embodiments of the disclosure. However, the disclosure according to the claims is not limited to the following embodiments. Moreover, all of the configurations described in the embodiments are not necessarily indispensable as means for solving the issue.

EMBODIMENT

Schematic Configuration

The transportation system according to the present embodiment is a system for transporting a device to be lent by a mobile robot in a device lending system, and acquires a collection route of the rented device by using a learned model. The learned model is a model that is machine-learned so as to input an end time prediction result and output a recovery route using learning data including the recovery result data and the recovery route data, which will be described in detail later.

Then, in this transport system, a mobile robot to be collected is determined by the acquired collection route. The transport system may then control the determined mobile robot and cause the collection of equipment to take place via the collection route.

In this transportation system, a collection route considering past collection result data is acquired from the prediction result of the end of use time of the rented equipment, and the mobile robot which becomes a collection subject is decided. Therefore, in this transport system, it is possible to recover the device by an efficient recovery route, and as a result, it is possible to efficiently suppress the residence time from the end of use of the device until the return by the mobile robot is completed.

Figure 1:
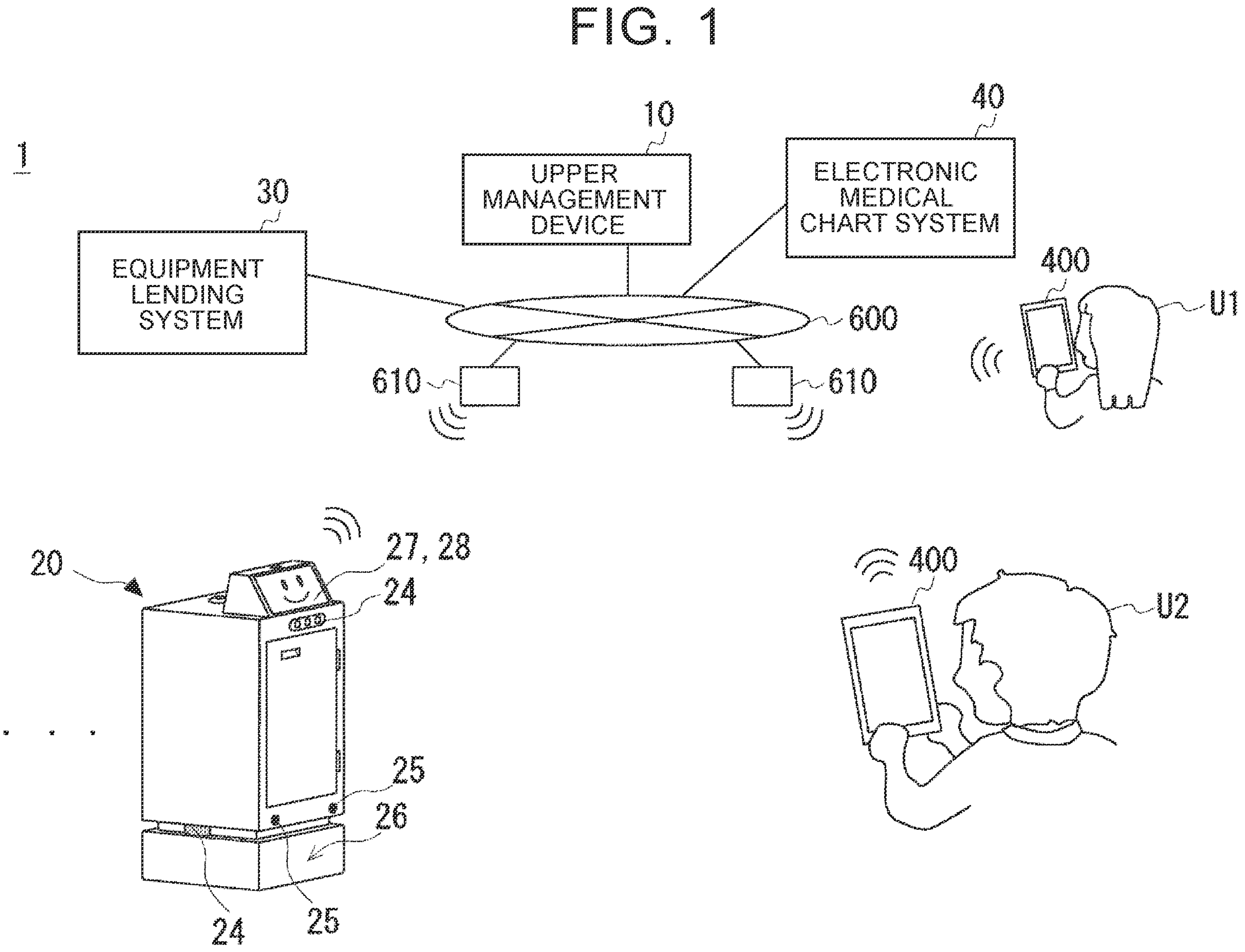
FIG. 1 is a conceptual diagram for describing an overall configuration example of a transport system according to the present embodiment.

First, an example of the transport system according to the present embodiment will be described. FIG. 1 is a conceptual diagram for explaining an overall configuration example of a transport system 1 according to the present embodiment. The transport system 1 according to the present embodiment is a system that transports a conveyed object by using a mobile robot capable of autonomous movement. Here, a mobile robot 20 as illustrated in FIG. 1 is exemplified as a mobile robot, but the configuration and shape of the mobile robot 20 are not limited thereto.

The transport system 1 includes, in addition to the mobile robot 20, a host management device 10, a medical device lending system (hereinafter referred to as a device lending system) 30, an electronic medical record system 40, a network 600, a communication unit 610, and a user terminal 400.

The mobile robot 20 is a transport robot that executes transportation of a transported object as a task. The mobile robot 20 autonomously travels in order to transport a transported object in a medical welfare facility such as a hospital, a rehabilitation center, a nursing facility, and an elderly care facility. The mobile robot 20 may be a mobile robot that autonomously moves with reference to a map. In addition, the mobile robot 20 can be a mobile robot that autonomously moves a preset region as a region of a part or all of the above-described map, a region indicated by latitude and longitude, or the like. However, the mobile robot 20 can be configured to be able to move autonomously while sensing its surroundings even outside the preset area, outside the entire area included in the map in the first place, or even in a mode in which the movement range is not set, for example.

A user U1 such as a user of the conveyed object, a user assistant, or an administrator of the conveyed object requests the mobile robot 20 to convey the conveyed object. The user U1 stores the conveyed object in the mobile robot 20 at the request location at the time of the conveyance request or at the reception destination (conveyance source) included in the conveyance request information. Of course, the accommodation of the conveyed object can also be carried out by a robot or the like for accommodation. It is to be noted that a mobile robot that is mounted and transported in a state in which the conveyed object is exposed can be adopted, but it is assumed that the conveyed object is transported in a state in which the conveyed object is accommodated in the mobile robot 20 for simplification of explanation.

In the present embodiment, it is only necessary to be able to convey a device to be lent (hereinafter referred to as a lending device) as a conveyed object. However, in the mobile robot 20, a consumable item such as a medicine or a packaging bag, or a transported item other than a lending device or a device, such as a specimen, a hospital meal, a stationery, or the like, may be transported.

The user U1 may request the conveyance of the lending device according to a schedule of the lending (lending schedule). As will be described later, the lending schedule can be managed by the device lending system 30, can be referred to by the user terminal 400 for a transport request by the user U1, and can also be referred to by the host management device 10.

The mobile robot 20 autonomously moves to the set destination and transports the rental device. That is, the mobile robot 20 executes a luggage transport task (hereinafter also simply referred to as a task). In the following description, it is assumed that a location where a lending device is mounted is a conveyance source, and a location where a lending device is reported is a conveyance destination.

For example, it is assumed that the mobile robot 20 moves in a general hospital having a plurality of clinical departments. The mobile robot 20 transports rental equipment among a plurality of clinical departments. For example, the mobile robot 20 delivers a rental device from a nurse station of one clinical department to a nurse station of another clinical department. Alternatively, the mobile robot 20 delivers the rental equipment from its storage to the nurse station of the clinical department. In addition, in a case where the conveyance destination is located on a different floor, the mobile robot 20 may move using an elevator or the like. The mobile robot 20 is also responsible for returning the lending device to a storage or the like.

Examples of lending devices include medical devices such as inspection devices and medical devices. Examples of the medical device include a bed slip prevention device, a blood pressure monitor, a blood transfusion pump, an infusion device such as a syringe pump, a foot pump, a nurse call, a bed leaving sensor, a foot pump, a low-pressure continuous inhaler, an electrocardiogram monitor, a medicinal product infusion controller, an enteral feeding pump, a ventilator, a cuff pressure gauge, a touch sensor, an aspirator, a nebulizer, a pulse oximeter, a blood pressure gauge, a resuscitator, a sterile device, and an echo device. In addition to these, various types of infusion devices, various types of vital monitors, and the like are also included as medical devices. Note that a plurality of models may be lent to each of various types of medical devices, for example, a pump having a different flow rate is also a target of lending.

In addition, some rental equipment is provided with a stand on its own. For example, such a lending device with a stand includes a low-pressure continuous aspirator, an echo device, an electrocardiogram monitor (transmitter), an electrocardiogram monitor (central monitor), an electrocardiogram monitor (bedside monitor), a ventilator, a nebulizer, and the like. Loan equipment with a stand is often operated by connecting to a commercial power source instead of a battery, and a loan warehouse is often stored as a storage place in comparison with a loan equipment without a stand.

It should be noted that the above-described lending equipment is not required until the sterilization of the main body, or only a part of the equipment needs to be disinfected, and some of the lending equipment is equipped with disposable equipment. Catheters, knife knives, scissors, and the like requiring sterilization can also be handled as lending equipment in the present embodiment when the storage location matches or is close to the location where sterilization is performed.

In the present embodiment, as shown in FIG. 1, the device lending system 30, the electronic medical record system 40, the mobile robot 20, and the user terminal 400 are connected to the host management device 10 via the network 600. The mobile robot 20 and the user terminals 400 are connected to the network 600 via the communication units 610. The network 600 may be a wired or wireless Local Area Network (LAN or Wide Area Network (WAN). The host management device 10 is connected to the network 600 by wire or wirelessly. The communication unit 610 is, for example, a wireless LAN unit installed in each environment. The communication unit 610 may be a general purpose communication device such as a WiFi router.

The user terminal 400 is, for example, a tablet computer, a smartphone, or the like, but may be an installation-type computer. The user terminal 400 only needs to be an information processing device capable of wireless or wired communication.

The user U1 or the user U2 can make a transport request using the user terminal 400. For example, the user U1 can access the device lending system 30 for a transport request from the user terminal 400 (which may be via the host management device 10), and can make a transport request for the lending device to the host management device 10 based on the referred result. The host management device 10 that has received the transfer request can perform the transfer request to the mobile robot 20.

As described above, various types of signals transmitted from the user terminal 400 of the user U1, U2 can be once transmitted to the host management device 10 via the network 600, and can be transferred from the host management device 10 to the target mobile robot 20. Similarly, various signals transmitted from the mobile robot 20 are once sent to the host management device 10 via the network 600, and transmitted from the host management device 10 to the target user terminal 400.

The host management device 10 is a server connected to each equipment, and collects data from each equipment. The host management device 10 is not limited to a physically single device, and may include a plurality of devices that performs distributed processing. Further, the host management device 10 may be distributed and arranged in an edge device such as the mobile robot 20. For example, a part or all of the transport system 1 may be mounted on the mobile robot 20.

The device lending system 30 is a system that manages a lending schedule (management information) indicating a lending date and time and a lending destination (a use place, a user, or the like) for each of the lending devices. The device lending system 30 may be a server connected to the host management device 10, and exchanges data with the host management device 10. Thus, the host management device 10 can obtain the lending schedule of the lending device managed by the device lending system 30. The device lending system 30 may be distributed and arranged in the host management device 10, or may be installed in the host management device 10.

The electronic medical record system 40 is a system that stores and manages electronic medical record data including information on a patient (also referred to as patient information). For example, when a medical practitioner such as a doctor or a nurse inputs patient information using the user terminal 400, the patient information is stored in a memory or the like of the electronic medical record system 40. Further, the medical personnel can view and update the patient information stored in the electronic medical record system 40 through the user terminal 400.

The electronic medical record system 40 may be a server connected to the host management device 10, and exchanges data with the host management device 10. As a result, the host management device 10 can obtain electronic medical record data managed by the electronic medical record system 40. The electronic medical record system 40 may be distributed and arranged in the host management device 10, or may be incorporated and arranged in the host management device 10.

The host management device 10 may be configured to read the medical condition, the operation schedule, and the like from the electronic medical record data registered in the electronic medical record system 40, determine the devices necessary for them, and register the lending of the lending devices, other accessories, and the like in the device lending system 30.

The user terminal 400 and the mobile robot 20 may transmit and receive signals without the host management device 10. For example, the user terminal 400 and the mobile robot 20 may directly transmit and receive signals by wireless communication. Alternatively, the user terminal 400 and the mobile robot 20 may transmit and receive signals via the communication unit 610.

The user U1 or the user U2 uses the user terminal 400 to request conveyance of the rental device. Hereinafter, the description is made assuming that the user U1 is the transport requester at the transport source and the user U2 is the planned recipient at the transport destination (destination). Needless to say, the user U2 at the transport destination can also make a transport request. Further, a user who is located at a location other than the transport source or the transport destination may make a transport request.

When the user U1 makes a conveyance request, the user terminal 400 is used to input the content of the lending device, the recipient of the lending device (hereinafter, also referred to as a conveyance source), the recipient of the lending device (hereinafter, also referred to as a conveyance destination), the scheduled arrival time to the conveyance source (reception time of the lending device), the scheduled arrival time to the conveyance destination (conveyance time limit), and the like. Hereinafter, these types of information are also referred to as transport request information. In the case of a lending device to be transported in the present embodiment, the transportation source may be a storage location (device management location) of the lending device. The conveyance source may be a location where the user U1 is located. The transport destination is a location where the user U2 or a patient who is scheduled to use the transported object is present. The user U1 can input the transport request information by operating the touch panel of the user terminal 400.

Among the conveyance request information, the lending device can be designated by using a lending schedule registered in the device lending system 30. For example, the user U1 designates a rental device from the user terminal 400, and mounts the rental device on the mobile robot 20 as needed, and makes a transfer request to the host management device 10. The host management device 10 that has received the transfer request refers to the device lending system 30, determines the transfer schedule so as to be in time for the use start time indicated by the lending schedule of the lending device, and performs the transfer request to the mobile robot 20, whereby the transfer is performed on the transfer schedule.

Alternatively, the user U1 makes a conveyance request while referring to the lending schedule from the user terminal 400, and the host management device 10 determines the conveyance schedule by referring to the lending schedule, and makes a conveyance request to the mobile robot 20, whereby conveyance is performed on the conveyance schedule. In addition to these, various methods of transportation request can be adopted.

These examples assume that a transfer request is made after a loan schedule is registered based on a loan request (a loan registration request). On the other hand, the lending equipment may be urgently required, and in such a case, the lending schedule for the lending equipment in the required time is not registered. In such cases, the user U1 can also transmit the transport request from the user terminal 400 to the host management device 10. Based on the transfer request, the host management device 10 refers to the device lending system 30 to check whether there is any duplication in the lending period, and if there is no problem, registers it in the lending schedule and makes a transfer request to the mobile robot 20. In this case, loading of the lending device into the mobile robot 20 can be performed, for example, at timings before and after transmission of the transport request from the user terminal 400.

In either case, as described above, the user terminal 400 can transmit the transport request data inputted by the user U1 to the host management device 10. The host management device 10 is a management system that manages a plurality of mobile robots 20, and transmits an operation command for executing a transfer task to each of the mobile robots 20. At this time, the host management device 10 determines the mobile robot 20 that executes the transfer task for each transfer request. The host management device 10 transmits a control signal including an operation command to the mobile robot 20. The mobile robot 20 moves from the transport source so as to arrive at the transport destination in accordance with the operation command.

For example, the host management device 10 assigns a transport task to the mobile robot 20 at or near the transport source. Alternatively, the host management device 10 assigns a transport task to the mobile robot 20 heading toward the transport source or its vicinity. The mobile robot 20 to which the task is assigned goes to take the lending device to the transfer source. The transportation source may be, for example, a storage location or a location where a user U1 requesting a task is located.

When the mobile robot 20 arrives at the transfer source, a user U1 or another staff member places the lending device on the mobile robot 20. A mobile robot 20 equipped with a lending device autonomously moves with a transfer destination as a destination. The host management device 10 transmits a signal to the user terminal 400 of the user U2 at the transport destination. As a result, the user U2 can know that the rental device is being transported and the expected arrival times. When the mobile robot 20 arrives at the set transfer destination, the user U2 can receive the rental device accommodated in the mobile robot 20. In this way, the mobile robot 20 executes the transfer task.

Further, in the overall configuration as described above, each element of the transport system can be distributed to the mobile robot 20, the user terminal 400, the device lending system 30, the electronic medical record system 40, and the host management device 10, and the transport system can be constructed as a whole. In addition, a substantial element for realizing the conveyance of the rental equipment may be assembled in a single apparatus. The host management device 10 controls one or more mobile robots 20.

Control System of the Transport System 1

Figure 2:
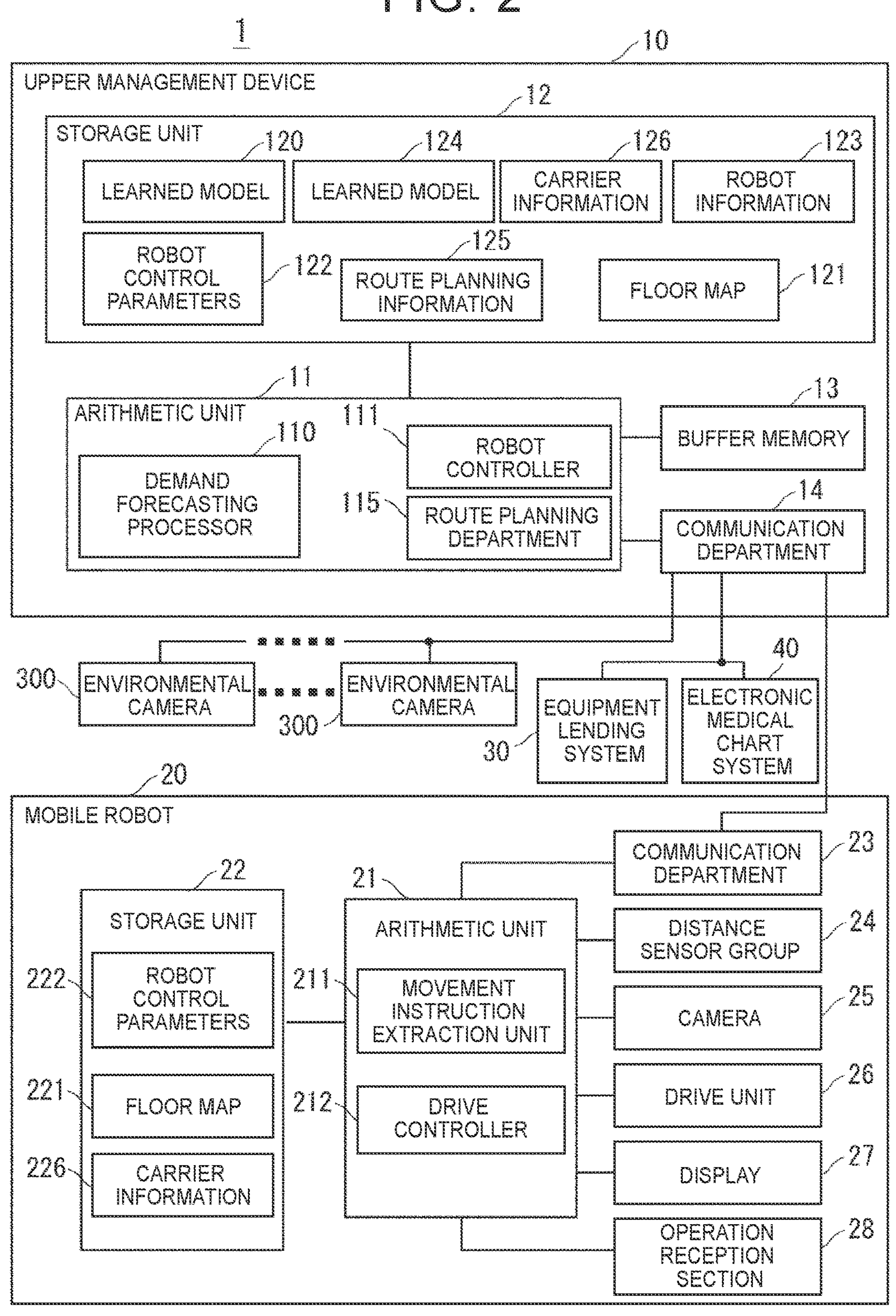
FIG. 2 is a control block diagram illustrating an example of the transport system according to the present embodiment.

FIG. 2 is a control block diagram illustrating an example of a control system of the transport system 1. As illustrated in FIG. 2, the transport system 1 may include a host management device 10, a mobile robot 20, a device lending system 30, an electronic medical record system 40, and an environmental camera 300.

The transport system 1 efficiently controls the mobile robots 20 while causing the mobile robots 20 to autonomously move within a predetermined facility. Therefore, a plurality of the environmental cameras 300 is installed in the facility. For example, the environmental cameras 300 are each installed in a passage, a hallway, an elevator, an entrance, etc. in the facility.

The environmental cameras 300 acquire images of ranges in which the mobile robot 20 moves. In the transport system 1, the image acquired by the environmental camera 300 and information based on the image are collected by the host management device 10. Alternatively, the images or the like acquired by the environmental cameras 300 may be directly transmitted to the mobile robots. The environmental cameras 300 may be surveillance cameras or the like provided in a passage or an entrance/exit in the facility. The environmental cameras 300 may be used to determine the distribution of congestion status in the facility.

In the transport system 1, the host management device 10 can perform route planning based on, for example, transport request information, and generate route planning information. The route planning information may be generated as information obtained by planning a transport route corresponding to the above-described transport schedule. The host management device 10 instructs a destination for each mobile robot 20 based on the generated route planning information. Then, the mobile robot 20 autonomously moves toward the destination designated by the host management device 10. The mobile robot 20 autonomously moves toward the destination using sensors, floor maps, position information, and the like provided in the mobile robot 20 itself.

For example, the mobile robot 20 travels so as not to come into contact with surrounding equipment, objects, walls, and people (hereinafter collectively referred to as peripheral objects). Specifically, the mobile robot 20 detects a distance to a surrounding object. Then, the mobile robot 20 travels in a state of being separated from the surrounding object by a certain distance (a distance threshold value) or more. When the distance from the peripheral object becomes equal to or less than the distance threshold value, the mobile robot 20 decelerates or stops. With this configuration, the mobile robot 20 can travel without coming into contact with the peripheral objects. Since contact can be avoided, safe and efficient transportation is possible.

The host management device 10 may include an arithmetic processing unit 11, a storage unit 12, a buffer memory 13, and a communication unit 14. The arithmetic processing unit 11 performs an arithmetic operation for controlling and managing the mobile robot 20. The arithmetic processing unit 11 can be implemented as, for example, a device capable of executing a program such as a Central Processing Unit (CPU) of a computer. Various functions can also be realized by the program. In FIG. 2, only the characteristic end time prediction processing unit 110, the robot control unit 111, and the route planning unit 115 are shown in the arithmetic processing unit 11, but other processing blocks are also provided.

The end time prediction processing unit 110 inputs, to the learned model 120 stored in the storage unit 12, rented device data indicating the medical device being lent and electronic medical record data describing information indicating the necessity of use of the medical device, and acquires an end time prediction result that is a result of predicting the end time of use of the medical device being lent from the learned model 120. The end time prediction processing unit 110 passes the obtained end time prediction result to the route planning unit 115. Note that the end time prediction processing unit 110 may be configured to notify the device lending system 30 of the end time prediction result via the communication unit 14.

Here, the information indicating the necessity of use of the medical device may refer to information indicating the medical device itself, information indicating an operation necessary for the patient, information indicating a symptom of the patient, information indicating a treatment to the patient, or the like, or information obtained by combining a plurality of pieces of the information.

The robot control unit 111 performs arithmetic for remotely controlling the mobile robot 20 and generates a control signal. The robot control unit 111 generates a control signal based on the route planning information 125 and the like, which will be described later. Further, the robot control unit 111 generates a control signal based on various types of information obtained from the environmental cameras 300 and the mobile robots 20. The control signal may include update information such as a floor map 121, robot information 123, and a robot control parameter 122, which will be described later. That is, when various types of information are updated, the robot control unit 111 generates a control signal in accordance with the updated information.

The route planning unit 115 performs route planning for each mobile robot 20. When the transport task is input, the route planning unit 115 performs route planning for transporting the lending equipment to the transport destination (destination) based on the transport request information. Specifically, the route planning unit 115 refers to the route planning information 125, the robot information 123, and the like that are already stored in the storage unit 12, and determines the mobile robot 20 that executes the new transport task.

The departure point is the current position of the mobile robot 20, the transfer destination of the immediately preceding transfer task, the receiving destination of the lending device, and the like. The destination is a conveyance destination of the rental device, but may be a standby location, a charging location, a storage location, or the like. Here, the route planning unit 115 sets passing points from the starting point to the destination of the mobile robot 20. The route planning unit 115 sets the passing order of the passing points for each mobile robot 20. The passing points are set, for example, at branch points, intersections, lobbies in front of elevators, and their surroundings. In a narrow passage, it may be difficult for the mobile robots 20 to pass each other. In such a case, a passage having a narrow width may be set as a passing point in front of the passage. Candidates for the passing points may be registered in the floor map 121 in advance.

The route planning unit 115 determines the mobile robot 20 that performs each transport task from among the mobile robots 20 such that the entire system can efficiently execute the task. For example, the route planning unit 115 can preferentially assign the transfer task to the mobile robot 20 that is in standby state or the mobile robot 20 that is close to the transfer source. In addition, the route planning unit 115 may perform the allocation in place of or in addition to the preferential allocation in accordance with other conditions such as equalization of the degree of deterioration of the mobile robot 20 as described later.

The route planning unit 115 sets passing points including the starting point and the destination for the mobile robot 20 to which the transport task is assigned. For example, when there are two or more movement routes from the transport source to the transport destination, the passing points are set such that the movement can be performed in a shorter time. Thus, the host management device 10 updates the information indicating the congestion status of the passages based on the images of the camera or the like. Specifically, locations where other mobile robots 20 are passing and locations with many people have a high degree of congestion. Therefore, the route planning unit 115 sets the passing points so as to avoid locations with a high degree of congestion.

The mobile robot 20 may be able to move to the destination by either a counterclockwise movement route or a clockwise movement route. In such a case, the route planning unit 115 sets the passing points so as to pass through the less congested movement route. The route planning unit 115 sets one or more passing points to the destination, whereby the mobile robot 20 can move along a movement route that is not congested. For example, when a passage is divided at a branch point or an intersection, the route planning unit 115 sets a passing point at the branch point, the intersection, the corner, and the surroundings as appropriate. Accordingly, the transport efficiency can be improved.

The route planning unit 115 may set the passing points in consideration of the congestion status of the elevator, the moving distance, and the like. Further, the host management device 10 may estimate the number of the mobile robots 20 and the number of people at the estimated time when the mobile robot 20 passes through a certain location. Then, the route planning unit 115 may set the passing points in accordance with the estimated congestion status. Further, the route planning unit 115 may dynamically change the passing points in accordance with a change in the congestion status. The route planning unit 115 sets the passing points sequentially for the mobile robot 20 to which the transport task is actually assigned. The passing points may include the transport source and the transport destination. The mobile robot 20 autonomously moves so as to sequentially pass through the passing points set by the route planning unit 115.

The route planning unit 115 can determine the mobile robot 20 and set the passing point as described above. The route planning unit 115 can also perform the same processing at the time of returning (at the time of collection) the lending device being lent.

However, the route planning unit 115 is configured to be able to set a recovery route, which is a transport route in this case, using the learned model 124 at the time of recovery. Also in this case, the set collection route may include a passing point including a departure point and a destination. The place of departure here is the borrower, and the destination is the storage place, maintenance place, or the next borrower.

The route planning unit 115 inputs, to the learned model 124, an end time prediction result that is a result of predicting the end time of use of the lending device being lent, and acquires a collection route that is collected by the mobile robot 20 using the lending device being lent as a returned product. The input end time prediction result can be the end time prediction result obtained by the end time prediction processing unit 110 using the learned model 120 and passed to the route planning unit 115. In this way, the route planning unit 115 can automatically create a route plan for the collection route. However, even if the learned model 124 does not output the collection route itself, it is also possible for the route planning unit 115 to output only a part of the information of the collection route and supplement the other information.

Then, the route planning unit 115 can execute a process of determining the mobile robot 20 that collects the lending device by the acquired collection route, that is, the mobile robot 20 that is the target of the control in order to collect the lending device. Although this determination will be described later, the route planning unit 115 can determine the mobile robot 20 based on a predetermined condition. The determination of the mobile robot 20 can also be executed by the robot control unit 111.

The storage unit 12 is a storage unit that stores information necessary for management and control of the mobile robot 20 and the like. In the example of FIG. 2, the learned model 120, the floor map 121, the robot information 123, the robot control parameter 122, the learned model 124, the route planning information 125, and the conveyed object information 126 are illustrated, but the information stored in the storage unit 12 may be other than this. The arithmetic processing unit 11 performs an arithmetic operation using information stored in the storage unit 12 when performing various kinds of processing. In addition, various kinds of information stored in the storage unit 12 can be updated to the latest information.

The learned model 120 is a learning model that has been machine-learned using learning data (hereinafter referred to as first learning data) including loan result data that is a result of lending a medical device as a lending device and includes a result of ending use of the medical device, and electronic medical record data in which information indicating the necessity of use of the lent medical device is described. Then, it is assumed that the learned model 120 has been subjected to machine learning so as to input electronic medical record data in which information indicating the necessity of use of the medical device is described and in-rent device data indicating the medical device being lent, and output an end time prediction result that is a prediction result of predicting the end time of use of the medical device. In other words, the learned model 120 is a model that is an algorithm for predicting the end time prediction result from the electronic medical record data and the equipment data being lent. Regardless of the algorithm or the like, such a prediction may be performed. Note that the learned model 120 and the learned model 124 to be described later can be updated at a predetermined timing in which the operation proceeds and data is accumulated.

Here, the loan result data is data indicating a loan result including a result of ending the use of the medical device for the medical device to be managed by the device lending system 30. The lending result data can be managed by a storage unit (a storage unit 32 described later) of the device lending system 30. The end of the use of the medical device can be obtained, for example, by the user U2 or the like based on the input from the user terminal 400, and the same applies to the beginning of the use of the medical device. In either case of the end of use or the start of use, the user terminal 400 can transmit the input result to the device lending system 30 directly or via the host management device 10 via the network 600 and record the input result as the lending result data together with the date and time. However, the start and end of the use of the medical device can be obtained by other methods. For example, in a case where the medical device is a device that receives power supply from an outlet, the start and end of use of the medical device are determined based on the power consumption detected by a sensor or the like attached to the outlet of the rental place (use place). The determination result is transmitted to the device lending system 30 directly or via the host management device 10 via the network 600. It can be recorded as loan record data along with the date and time. Alternatively, by performing communication between the medical device side and a predetermined place as a lending place, it is determined that the use of the medical device is started and ended by the medical device and the predetermined place being close to each other and separated from each other, and the determination result can be transmitted to the device lending system 30 directly or via the host management device 10 via the network 600, and recorded as the lending result data together with the date and time. The communication can be realized by, for example, using a beacon that emits radio waves such as Bluetooth (registered trademark) and Bluetooth Low Energy (registered trademark) and a device that detects the radio waves, or using a Radio Frequency Identification (RFID) tag such as a Near field communication (NFC) tag and a tag reader thereof. It should be noted that the medical device and the predetermined location may be the originating side and the receiving side, and whether the medical device incorporates such a communication function or the device having such a communication function may be externally attached.

The learned model 124 is a learning model that has been machine-learned by using learning data (hereinafter referred to as second learning data) including collection result data indicating a collection result including, after lending the lending device, the end-of-use time at which the use of the lending device has ended and the collection completion time collected as a returned product, and collection route data indicating a collection route at which the lending device has been collected by the mobile robot 20.

Here, the end-of-use period can be acquired as described for the end-of-use of the loan result data. Similarly, the collection completion time may be acquired as an input result at the user terminal 400, or may be acquired by communication between the medical device and a predetermined location. However, the collection completion time may be a collection completion time, and may be a date and time (transportation completion time) when the lending device is transported to the storage place or the next lending place, or may be, for example, a transportation start time when such transportation is started. Therefore, in a case where the collection completion time is acquired by communication between the medical device and the predetermined place, the predetermined place is a place where the collection is completed (such as a storage place or the next lending place).

Then, it is assumed that the learned model 124 is subjected to machine learning so as to input an end time prediction result, which is a result of predicting the end time of use of the lending device being lent, and output a collection route for collecting the lending device being lent as a returned product by the mobile robot 20. In other words, the learned model 124 is a model that is an algorithm for predicting a recovery route from the end time prediction result. Regardless of the algorithm or the like, such a prediction may be performed. Here again, a case where the device to be learned and predicted by the learned model 124 is a medical device is described. Therefore, the end time prediction result input to the learned model 124 can be an output result from the learned model 120 as described above.

The floor map 121 is map information of a facility in which the mobile robot 20 moves. The floor map 121 may be created in advance. The floor map 121 may be generated from information obtained from the mobile robot 20. In addition, the floor map 121 may be a base map created in advance plus map correction information generated from information obtained from the mobile robot 20.

The robot information 123 indicates the ID, model number, specifications, and the like of the mobile robot 20 managed by the host management device 10. The robot information 123 may include position information indicating the current position of the mobile robot 20. The robot information 123 may include information on whether the mobile robot 20 is executing a task or at standby. Further, the robot information 123 may also include information indicating whether the mobile robot 20 is operating, out-of-order, or the like. Further, the robot information 123 may include information on a transportable lending device and a non-transportable lending device.

The robot control parameter 122 indicates control parameters such as a threshold distance from a peripheral object for the mobile robot 20 managed by the host management device 10. The threshold distance is a margin distance for avoiding contact with the peripheral objects including a person. Further, the robot control parameter 122 may include information on an operation intensity such as a speed upper limit value of a moving speed of the mobile robot 20.

The robot control parameter 122 may be updated depending on the situation. The robot control parameter 122 may include information indicating an empty state or a usage state of the accommodation space in the mobile robot 20. The robot control parameter 122 may include information of a transportable lending device or a non-transportable lending device. Of course, the robot control parameter 122 may also include information indicating the possibility/impossibility of transporting the conveyed object other than the lending device. The above-described various types of information in the robot control parameter 122 are associated with each mobile robot 20.

The route planning information 125 includes the route planning information planned by the route planning unit 115. The route planning information 125 includes, for example, information indicating a transport task. The route planning information 125 may include information such as ID of the mobile robot 20 to which the task is assigned, the departure point, the content of the rental device, the conveyance destination, the conveyance source, the scheduled arrival time to the conveyance destination, the scheduled arrival time to the conveyance source, and the arrival time. In the route planning information 125, the various types of information described above may be associated with each transport task. The route planning information 125 may include at least a part of the conveyance request information inputted from the user U1 or the like with respect to both the lending conveyance and the return conveyance, and may include at least a part of the information included in the collection route outputted from the learned model 124 with respect to the return conveyance.

Here, the route planning information 125 may include information on the passing point for each of the mobile robot 20 and the transfer task. For example, the route planning information 125 includes information indicating the passing order of the passing points for each mobile robot 20. The route planning information 125 may include the coordinates of each passing point on the floor map 121 and information on whether the mobile robot 20 has passed the passing points.

The conveyed object information 126 is information related to the lending device on which the conveyance request is made. For example, it includes information such as the content (type) of the lending device, the conveyance source, and the conveyance destination. Needless to say, the conveyed object information 126 may include information on conveyed objects other than the rental equipment, and the same applies hereinafter to the conveyed object information 126. The conveyed object information 126 may include an ID of the mobile robots 20 in charge of conveyance. Further, the conveyed object information 126 may include information indicating a status such as during conveyance, before conveyance (before mounting), and after conveyance, and the status may also include information indicating whether the conveyance is for lending or for return. The conveyed object information 126 is associated with each lending device. The details of the conveyed object information 126 will be described later.

The route planning unit 115 can formulate a route plan by referring to various types of information stored in the storage unit 12. The route planning unit 115 may determine the mobile robot 20 that executes the task based on, for example, the floor map 121, the robot information 123, the robot control parameter 122, and the route planning information 125. Then, the route planning unit 115 can set the passing point to the conveyance destination and the passing order thereof with reference to the floor map 121 or the like. Candidates for the passing points are registered in the floor map 121 in advance. Then, the route planning unit 115 can set the passing point according to the congestion state or the like. In the case of continuous processing of tasks, the route planning unit 115 may set the transport source and the transport destination as the passing points.

In addition, two or more mobile robots 20 may be assigned to one transfer task. For example, when the lending device is larger than the transportable capacity of the mobile robot 20, one lending device is divided into two pieces and mounted on the two mobile robots 20. Alternatively, when the lending device is heavier than the transportable weight of the mobile robot 20, one lending device is divided into two and mounted on the two mobile robots 20. With this configuration, one transport task can be shared and executed by two or more mobile robots 20. Of course, in the case of controlling the mobile robots 20 having different sizes, a route plan may be performed so that the mobile robots 20 capable of transporting the rental equipment receive the rental equipment.

Further, one mobile robot 20 may perform two or more transport tasks in parallel. For example, one mobile robot 20 may simultaneously mount two or more lending devices and sequentially transport them to different transport destinations. Alternatively, other lending devices may be mounted while one mobile robot 20 is transporting one lending device. In addition, the transfer destinations of the lending devices mounted at different locations may be the same or may be different. With this configuration, the tasks can be executed efficiently.

In such a case, storage information indicating the usage status or the availability of the storage space of the mobile robot 20 may be updated. That is, the host management device 10 may manage the storage information indicating the availability and control the mobile robot 20. For example, when the loading or receiving of the lending device is completed, the accommodation information is updated. When the transfer task is input, the host management device 10 refers to the accommodation information and directs the mobile robot 20 having an empty space on which the rental device can be mounted to the reception. With this configuration, one mobile robot 20 can execute a plurality of transport tasks at the same time, and two or more mobile robots 20 can share and execute the transport tasks. For example, a sensor may be installed in the accommodation space of the mobile robot 20 to detect an empty state. In addition, the capacity and weight of each lending device may be registered in advance.

The buffer memory 13 is a memory that stores intermediate information generated in the processing of the arithmetic processing unit 11. The communication unit 14 is a communication interface for communicating with a plurality of environmental cameras 300, at least one mobile robot 20, and the like provided in a facility in which the transport system 1 is operated. The communication unit 14 can perform both wired communication and wireless communication. For example, the communication unit 14 transmits a control signal necessary for controlling the mobile robot 20 to each of the mobile robots 20 based on an instruction from the arithmetic processing unit 11. In addition, the communication unit 14 can receive information collected by the mobile robot 20 or the environmental camera 300 and pass the information to the arithmetic processing unit 11. In addition, the communication unit 14 can receive information such as a lending schedule from the device lending system 30, pass the information to the arithmetic processing unit 11, and transmit information such as a lending schedule to the device lending system 30 for registration based on an instruction from the arithmetic processing unit 11. Further, the communication unit 14 can receive the electronic medical record information from the electronic medical record system 40 and pass the electronic medical record information to the arithmetic processing unit 11.

The mobile robot 20 may include an arithmetic processing unit 21, a storage unit 22, a communication unit 23, a proximity sensor (for example, a distance sensor group 24), a camera 25, a drive unit 26, a display unit 27, and an operation reception unit 28. In FIG. 2, only a typical processing block included in the mobile robot 20 is illustrated, but the mobile robot 20 also includes many other processing blocks not illustrated.

The communication unit 23 is a communication interface for communicating with the communication unit 14 of the host management device 10. The communication unit 23 communicates with the communication unit 14 using, for example, a wireless signal. The distance sensor group 24 is, for example, a proximity sensor, and outputs proximity object distance information indicating a distance from an object or a person that is present around the mobile robot 20. The distance sensor group 24 may include, for example, a front-rear distance sensor and a left-right distance sensor, and may measure a distance of a peripheral object in the front-rear direction and a distance of a peripheral object in the left-right direction of the mobile robot 20.

The camera 25, for example, captures an image for grasping the surrounding situation of the mobile robot 20. The camera 25 captures an image of, for example, a forward direction in the traveling direction of the mobile robot 20. The camera can also capture an image of a position marker provided on the ceiling or the like of the facility, for example. The mobile robot 20 may be made to grasp the position of the mobile robot 20 itself using this position marker.

The drive unit 26 drives drive wheels provided on the mobile robot 20. Note that, the drive unit 26 may include an encoder or the like that detects the number of rotations of the drive wheels and the drive motor thereof. The own position (current position) may be estimated in accordance with the output of the encoder. The mobile robot detects its current position and transmits the information to the host management device 10.

The display unit 27 and the operation reception unit 28 are realized by a touch panel display. The display unit 27 displays a user interface screen that serves as the operation reception unit 28. Further, the display unit 27 may display information indicating the destination of the mobile robot 20 and the state of the mobile robot 20. The operation reception unit 28 receives an operation from the user. The operation reception unit 28 includes various switches provided on the mobile robot 20 in addition to the user interface screen displayed on the display unit 27.

The arithmetic processing unit 21 performs an arithmetic operation used for controlling the mobile robot 20. The arithmetic processing unit 21 can be implemented as, for example, a device capable of executing a program such as a CPU of a computer. Various functions can also be realized by the program. The arithmetic processing unit 21 includes a movement command extraction unit 211 and a drive control unit 212. In FIG. 2, only a typical processing block included in the arithmetic processing unit 21 is shown, but a processing block (not shown) is also included. The arithmetic processing unit 21 may search for a route between the passing points.

The movement command extraction unit 211 extracts a movement command from the control signal given by the host management device 10. For example, the movement command includes information on the next passing point. For example, the control signal may include information on the coordinates of the passing points and the passing order of the passing points. The movement command extraction unit 211 extracts these types of information as a movement command.

Further, the movement command may include information indicating that the movement to the next passing point has become possible. When the passage width is narrow, the mobile robots 20 may not be able to pass each other. In addition, the mobile robot 20 may be temporarily unable to pass through the passage. In such a case, the control signal includes a command to stop the mobile robot 20 at a passing point before the location at which the mobile robot 20 should stop. Then, after the other mobile robot 20 passes or after the mobile robot 20 becomes able to pass, a control signal indicating that the host management device 10 has become able to move to the mobile robot 20 is output. Thus, the mobile robot 20 that has been temporarily stopped resumes movement.

The drive control unit 212 controls the drive unit 26 such that the drive unit 26 moves the mobile robot 20 based on the movement command given from the movement command extraction unit 211. For example, the drive unit 26 includes drive wheels that rotate in accordance with a control command value from the drive control unit 212. The movement command extraction unit 211 extracts the movement command such that the mobile robot 20 moves toward the passing point received from the host management device 10. The drive unit 26 rotationally drives the drive wheels. The mobile robot 20 autonomously moves toward the next passing point. With this configuration, the mobile robot 20 sequentially passes the passing points and arrives at the transport destination. Further, the mobile robot 20 may estimate its own position and transmit a signal indicating that it has passed through the passing point to the host management device 10. Thus, the host management device 10 can manage the current position and the transportation status of each mobile robot 20.

Here, by analyzing the image data output from the camera 25 and the detection signal output from the distance sensor group 24, the drive control unit 212 can identify the position of the own apparatus and recognize the surrounding object. Then, the drive control unit 212 can control the drive unit 26 so as to move the mobile robot 20 based on the result and the movement command. At this time, the drive control unit 212 can recognize the surrounding object and identify the position of the own device with reference to the floor map 221 and the robot control parameter 222.

The storage unit 22 stores a floor map 221, a robot control parameter 222, and conveyed object information 226. Although only a part of the information stored in the storage unit 22 is illustrated in FIG. 2, information other than the floor map 221, the robot control parameter 222, and the conveyed object information 226 illustrated in FIG. 2 is also included. The floor map 221 is map information of a facility in which the mobile robot 20 moves. The floor map 221 is, for example, data obtained by downloading a part or all of the floor map 121 of the host management device 10. Note that the floor map 221 may be created in advance. Further, the floor map 221 may not be the map information of the entire facility but may be the map information including part of the area in which the mobile robot is scheduled to move.

The robot control parameter 222 is a parameter for operating the mobile robot 20. The robot control parameter 222 includes, for example, the distance threshold value from a peripheral object. Further, the robot control parameter 222 also includes a speed upper limit value of the mobile robot 20.

The conveyed object information 226 includes information related to a lending device, similarly to the conveyed object information 126. Information such as the content (type, i.e., model) of the lending device, the conveyance source, and the conveyance destination can be included. The conveyed object information 226 may include information indicating a status such as during conveyance, before conveyance (before mounting), and after conveyance, and may also include information indicating whether the conveyance is for lending or for return. The conveyed object information 226 is associated with each lending device. The conveyed object information 226 may include information on a lending device conveyed by the mobile robot 20. Therefore, the conveyed object information 226 is part of the conveyed object information 126. That is, the conveyed object information 226 may not include information conveyed by the other mobile robots 20. The conveyed object information 126 will be described later.

The drive control unit 212 refers to the robot control parameter 222 and stops the operation or decelerates in response to the fact that the distance indicated by the distance information obtained from the distance sensor group 24 has fallen below the distance threshold value. The drive control unit 212 controls the drive unit 26 such that the mobile robot 20 travels at a speed equal to or lower than the speed upper limit value. The drive control unit 212 limits the rotation speed of the drive wheels such that the mobile robot 20 does not move at a speed equal to or higher than the speed upper limit value.

Figure 3:
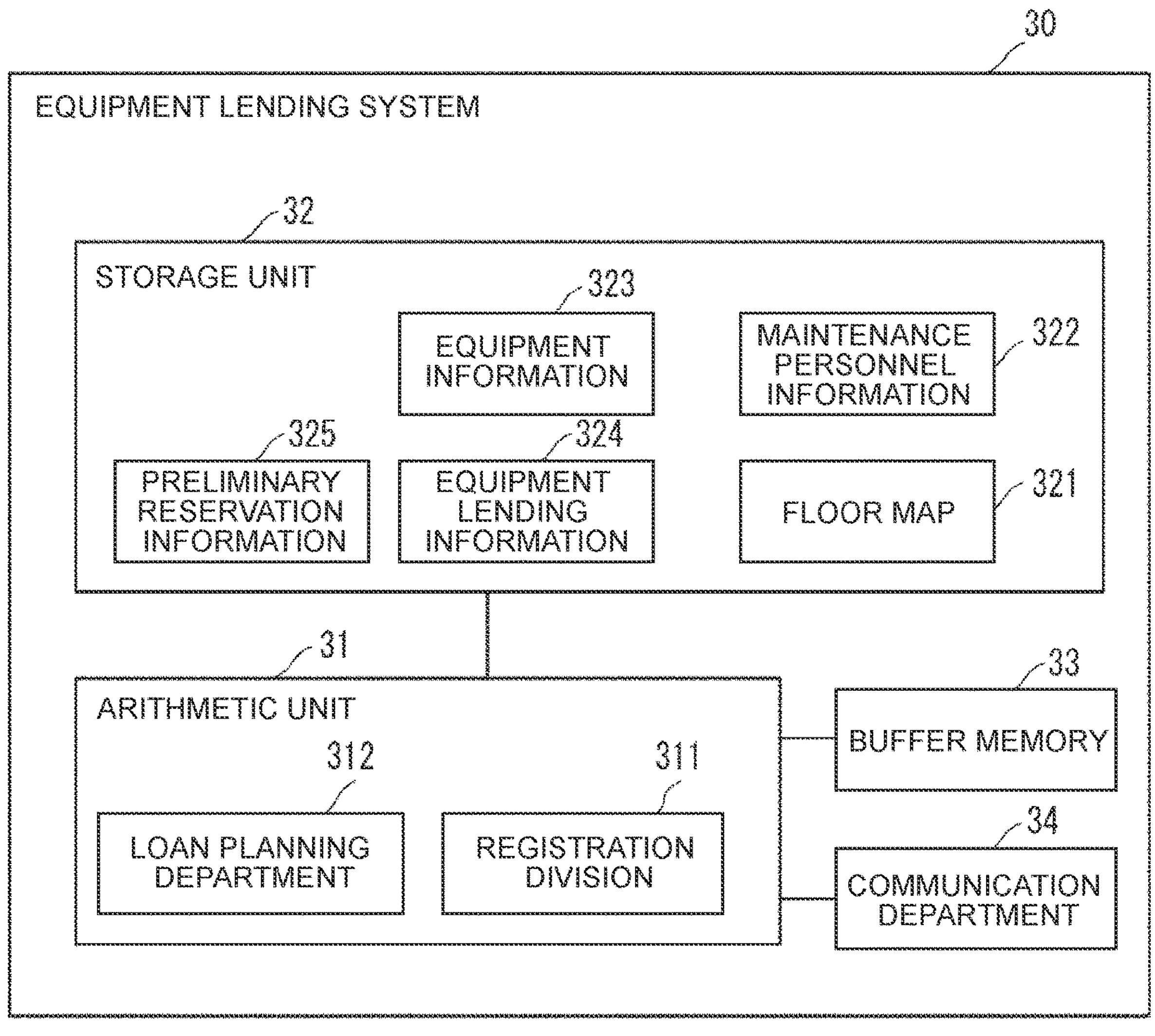
FIG. 3 is a control block diagram illustrating an example of the device lending system of FIG. 2.

FIG. 3 is a control block diagram illustrating an example of the device lending system 30 in the transport system 1 of FIG. 2. As illustrated in FIG. 3, the device lending system 30 may include an arithmetic processing unit 31, a storage unit 32, a buffer memory 33, and a communication unit 34. The arithmetic processing unit 31 performs an arithmetic operation for generating and managing a schedule of the lending device. The arithmetic processing unit 31 can be implemented as, for example, a device capable of executing a program such as a CPU of a computer. Various functions can also be realized by the program. In FIG. 3, only the characteristic registration unit 311 and the lending planning unit 312 are shown in the arithmetic processing unit 31, but other processing blocks are also provided.

The registration unit 311 receives, via the communication unit 34, the lending request information including ID, the usage starting time, the usage ending time, and the usage location of the lending device, which is transmitted from the user terminal 400 in accordance with the manipulation by the user U1, for example, and receives the registration.

Further, the registration unit 311 receives, via the communication unit 34, the loan provisional reservation information including ID, the usage starting time, the usage ending time, and the usage location of the loan device transmitted from the user terminal 400 according to, for example, an operation by the user U1 with respect to the loan device that performs the provisional reservation, and accepts the provisional registration. Further, the registration unit 311 receives, via the communication unit 34, a formal loan request or a cancellation request for the received provisional registration transmitted from the user terminal 400 in accordance with, for example, an operation by the user U1. However, the function of performing the temporary reservation is not essential.

Based on the loan request information received by the registration unit 311, the lending planning unit 312 refers to the device lending information 324 indicating the already planned loan schedule, the temporary reservation information 325 indicating the already provisionally reserved loan schedule, and the other loan request information and the provisional loan reservation information requested at the same time, considering the cancellation request requested at the same time, and confirming that there is no duplication. Of course, in the determination of duplication, even if the same type of medical device is not subject to lending, it is treated as not being duplicated. If there is no duplication, the lending planning unit 312 generates a lending schedule of the lending device based on the received lending request information, and updates the device lending information 324. In a case where the loan request information received by the registration unit 311 is information that overlaps with the existing loan schedule or the like in time (overlaps with the conveyance time), the lending planning unit 312 performs the next reply. That is, the lending planning unit 312 returns a notification indicating duplication to the transmission source of the lending request information (the user terminal 400 or the host management device 10) via the communication unit 34.

Like the loan request information, the lending planning unit 312 confirms that the loan provisional reservation information received by the registration unit 311 does not overlap with the loan provisional reservation information by referring to the already planned loan schedule or the like based on the loan provisional reservation information. If there is no overlap, the lending planning unit 312 generates a lending schedule of the lending device based on the received lending provisional reservation information, and updates the temporary reservation information 325. Note that the information can be shared by using a flag indicating whether the device lending information 324 and the temporary reservation information 325 are formal loans or temporary reservations, or adding a status indicating this fact in the case of a temporary reservation.

Further, the lending planning unit 312 performs formal registration by moving the target information from the temporary reservation information 325 to the device lending information 324 in response to the formal request for the provisional registration received by the registration unit 311. Further, the lending planning unit 312 deletes the target information from the temporary reservation information 325 in response to the cancellation request for the temporary registration received by the registration unit 311, thereby deleting the temporary reservation. As exemplified by the registration unit 311 and the lending planning unit 312 in the above, the device lending system 30 may include a reservation system that temporarily reserves the lending of the medical device.

The storage unit 32 is a storage unit that stores information necessary for lending management of a lending device and control of the device lending system 30. In the example of FIG. 3, the floor map 321, the maintenance person information 322, the device information 323, the device lending information 324, and the temporary reservation information 325 are illustrated, but the information stored in the storage unit 32 may be other than this. The arithmetic processing unit 31 performs an arithmetic operation using information stored in the storage unit 32 when performing various kinds of processing. In addition, various kinds of information stored in the storage unit 32 can be updated to the latest information.

The device information 323 is information indicating an ID, a model (model number), a size, a weight, and the like of the lending device, and may include information indicating whether or not the device is being lent (that is, inventory information indicating an inventory status), and information indicating a time and a storage location required for maintenance. At least a part of the device information 323 or all of the device information 323 necessary for transportation can be registered in the host management device 10 as a part of the conveyed object information 126. The inventory information may not be included as a part of the device information 323, and may be included as a part of the device information 323 and may be included as a part of the device lending information 324.

The maintenance person information 322 is information associated with each lending device indicated by the device information 323, and may include information indicating a maintenance person who provides each lending device (such as a ID of the maintenance person himself or herself or information indicating a type of the maintenance person) and information indicating a notification destination to each maintenance person. The maintenance person information 322 may be stored in order to notify the maintenance person of the maintenance after the completion of the lending, although the maintenance may be performed before the next lending. The notification for maintenance can be made via the communication unit 14 when the arithmetic processing unit 11 refers to the maintenance person information 322 and the medical device that needs maintenance is transported to the storage location after use. However, this notification can also be executed by the mobile robot 20. With such a notification, the maintenance person can move to the storage place where the lent medical device is transported, as necessary. At the storage location, for example, a maintenance person such as a user U2 performs maintenance such as inspection, cleaning, and replacement of consumables in preparation for the following use, as needed. Examples of maintenance personnel include clinical laboratory technicians, clinical radiology technicians, occupational therapists, physical therapists, clinical engineers, doctors, nurses, and quasi-nurses, as well as technicians from manufacturers of lending equipment.

The floor map 321 may be part or all of the floor map 121. As described above, the device lending information 324 is information indicating a rental schedule for each rental device generated by the lending planning unit 312, and the temporary reservation information 325 is information indicating a temporary reservation for the rental device. The device lending information 324 and the temporary reservation information 325 will be described later.

The buffer memory 33 is a memory that stores intermediate information generated in the processing in the arithmetic processing unit 31. The communication unit 34 is a communication interface for communicating with the host management device 10, and the communication interface may be configured to also communicate with the user terminal 400, the mobile robot 20, and the electronic medical record system 40. The communication unit 34 can perform both wired communication and wireless communication. For example, the communication unit 34 can receive information such as loan request information and provisional loan reservation information from the host management device 10 or the user terminal 400 and pass the information to the arithmetic processing unit 31, and can transmit information such as a loan schedule to the host management device 10 based on an instruction from the arithmetic processing unit 31.

The communication unit 34 can also receive the electronic medical record information from the electronic medical record system 40 and pass the electronic medical record information to the arithmetic processing unit 31. In this case, the registration unit 311 of the arithmetic processing unit 31 may determine whether or not the medical device needs to be lent for surgery or other procedures based on the received electronic medical record information, and, in a necessary case, may generate the lending request information or the lending provisional reservation information of the medical device and pass the information to the lending planning unit 312.

Here, when the registration unit 311 includes information directly indicating a medical device that needs to be lent in the electronic medical record information at the time of the generation, it is possible to generate the lending request information or the provisional lending reservation information for generating the device lending information 324 from the electronic medical record information. On the other hand, when the information directly indicating such a medical device is not included, the registration unit 311 may select a medical device corresponding to a symptom name or the like in accordance with a predetermined rule, and generate loan request information or loan provisional reservation information. Further, the registration unit 311 can determine whether to generate the loan request information or the provisional loan reservation information in accordance with a predetermined rule, and can generate the provisional loan reservation information in a case where, for example, the period until the treatment is one month ahead, one week ahead, or the like for a predetermined period or more, and in other cases, can generate the loan request information. Alternatively, the registration unit 311 may generate the lending request information for the medical device related to the determined treatment, and may generate the provisional lending reservation information in other cases.

The lending planning unit 312 registers the device lending information 324 or the temporary reservation information 325 based on the loan request information or the provisional loan reservation information received in this manner.

Alternatively, the communication unit 34 may receive, from the electronic medical record system 40, the lending request information, the provisional lending reservation information, and the like of the medical device based on the electronic medical record information, and may pass the information to the arithmetic processing unit 31. In this case, the registration unit 311 of the arithmetic processing unit 31 receives the received loan request information or the loan provisional reservation information, and registers the device lending information 324 or the temporary reservation information 325 based on the information received by the lending planning unit 312.

However, as exemplified by the operation performed by the user U1, the registration by the registration unit 311 can be performed by the doctor, the nurse, or the like making a determination of the necessity and performing the operation.

Figure 4:
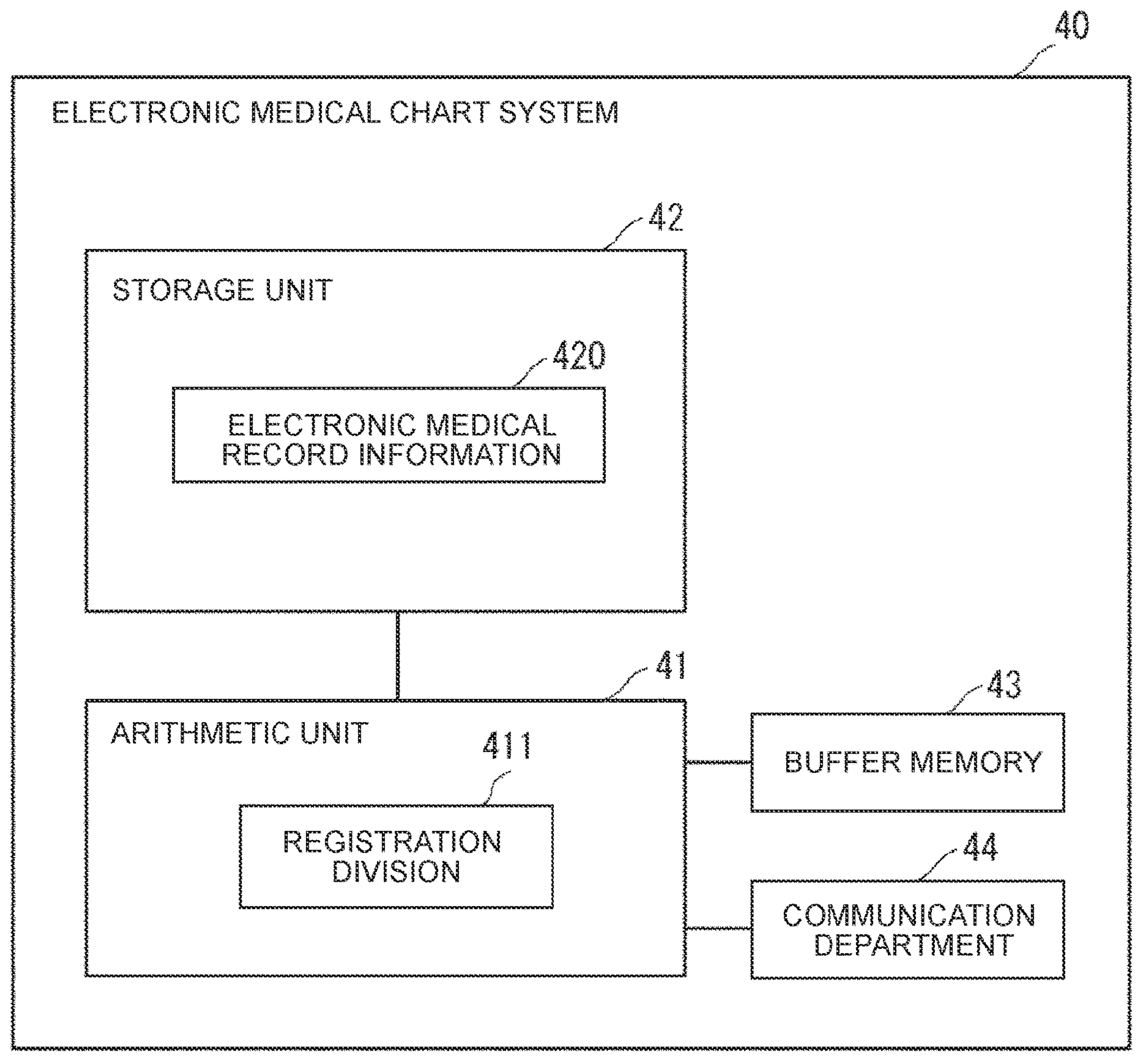
FIG. 4 is a control block diagram illustrating an example of the electronic medical record system of FIG. 2.

FIG. 4 is a control block diagram illustrating an example of the electronic medical record system 40 of FIG. 2. As illustrated in FIG. 4, the electronic medical record system 40 may include an arithmetic processing unit 41, a storage unit 42, a buffer memory 43, and a communication unit 44. The arithmetic processing unit 41 performs an arithmetic operation for generating and managing electronic medical record data. The arithmetic processing unit 41 can be implemented as, for example, a device capable of executing a program such as a CPU of a computer. Various functions can also be realized by the program. In FIG. 4, only the characteristic registration unit 411 is shown in the arithmetic processing unit 41, but other processing blocks are also provided.

The registration unit 411 receives, via the communication unit 44, medical record registration request information including, for example, a patient's ID, condition, treatment (including surgery), treatment schedule, treatment location, and the like transmitted from the user terminal 400 in accordance with an operation performed by the user U1, accepts registration, and stores the registration as the electronic chart information 420 in the storage unit 42. The medical record registration request information may include a patient's name, a medical record ID, the necessity or schedule of hospitalization, a staff member or a team of staff members such as a surgeon in the event of an operation, and the like.

The storage unit 42 is a storage unit that stores electronic chart information 420 to be managed by the electronic medical record system 40 and other information necessary for controlling the electronic medical record system 40. Although the electronic chart information 420 is illustrated in the example of FIG. 4, the information stored in the storage unit 42 may be other than this. The arithmetic processing unit 41 performs an arithmetic operation using the above-described other information stored in the storage unit 42 when performing various kinds of processing. In addition, various kinds of information stored in the storage unit 42 can be updated to the latest information.

The electronic chart information 420 may include information for which registration is requested as medical record registration request information. Note that, among the electronic chart information 420, for example, a medical record ID, a patient ID, and the like can be automatically attached in accordance with a predetermined rule such as a serial number. The electronic chart information 420 will be described later.

The buffer memory 43 is a memory that stores intermediate information generated in the processing in the arithmetic processing unit 41. The communication unit 44 is a communication interface for communicating with the host management device 10, and the communication interface may be configured to also communicate with the user terminal 400, the mobile robot 20, and the device lending system 30. The communication unit 44 can perform both wired communication and wireless communication. The communication unit 44 can receive the medical record registration request information from the host management device 10 or the user terminal 400 and pass the received information to the arithmetic processing unit 41, or can transmit the electronic chart information 420 to the host management device 10 based on an instruction from the arithmetic processing unit 41.

In addition, the communication unit 44 can also transmit, for example, the electronic chart information 420 or the lending request information, the provisional lending reservation information, and the like of the medical device based on the electronic chart information 420 to the device lending system 30 based on the instruction from the arithmetic processing unit 41. In the latter case, the arithmetic processing unit 41 refers to the electronic chart information 420, determines whether or not lending of the medical device is necessary for the operation or other treatment, and when it is necessary, passes an instruction to transmit the lending request information or the provisional lending reservation information of the medical device to the communication unit 44. Here, when the electronic chart information 420 includes information directly indicating a medical device that needs to be lent, the arithmetic processing unit 41 can generate the lending request information or the provisional lending reservation information for generating the device lending information 324 from the electronic chart information 420. On the other hand, in a case where the information directly indicating such a medical device is not included, the arithmetic processing unit 41 can select a medical device corresponding to a symptom name or the like according to a predetermined rule and generate loan request information or loan provisional reservation information.

Further, as to which of the lending request information and the provisional loan reservation information is to be generated, the arithmetic processing unit 41 can determine and generate the loan request information in accordance with a predetermined rule, and can generate the temporary loan reservation information in a case where, for example, the period until the treatment is a predetermined period or longer, such as one month or one week ahead, and in other cases, generate the loan request information. Alternatively, the arithmetic processing unit 41 can generate the lending request information for the medical device related to the determined treatment, and can generate the provisional lending reservation information in other cases.

Electronic Chart Information 420

FIG. 5 is a table showing an example of the electronic chart information 420 stored in the electronic medical record system 40 of FIG. 4. As described above, the electronic chart information 420 may include information for which registration is requested as medical record registration request information. For example, the electronic chart information 420 may include a medical record ID, a patient ID, a patient name, a condition, a procedure (including an operation, medication, and the like), a procedure schedule, a treatment location, whether or not hospitalization is required, a schedule of treatment, etc. Further, the electronic chart information 420 may include information indicating a prognosis, that is, information indicating a progress of a symptom after the treatment.

Here, the symptom may include a disease name, an image indicating a position of the disease, and the like. In the example of the table in FIG. 5, a link indicating a storage location of a file indicating this image is described. In addition, in the case of an operation, the person to be treated may be a staff member such as a surgeon or a team of staff members. Note that, in FIG. 5, the planned treatment person is exemplified as a user U1, U2 who performs an operation of registering the electronic chart information 420, that is, is exemplified as a planned user who arranges and collects transportation. However, for the sake of simplicity, the prospective treatment person may be a person different from the prospective user, or the person who performs the registration operation of the electronic chart information 420 may not be the prospective user or the prospective treatment person. Here, the planned treatment person or the planned user is an example of staff information indicating at least one of a staff member who uses the medical device and a group to which the staff member belongs (for example, a group classified in a ward or the like).

The electronic chart information 420 is not limited to the example of FIG. 5, and may include information to be included in a normal medical record. Further, the electronic chart information 420 may include information directly indicating a medical device when the medical device is required for surgery or other procedures.

Device Lending Information 324, Temporary Reservation Information 325, and conveyed Object Information 126

Figure 8:
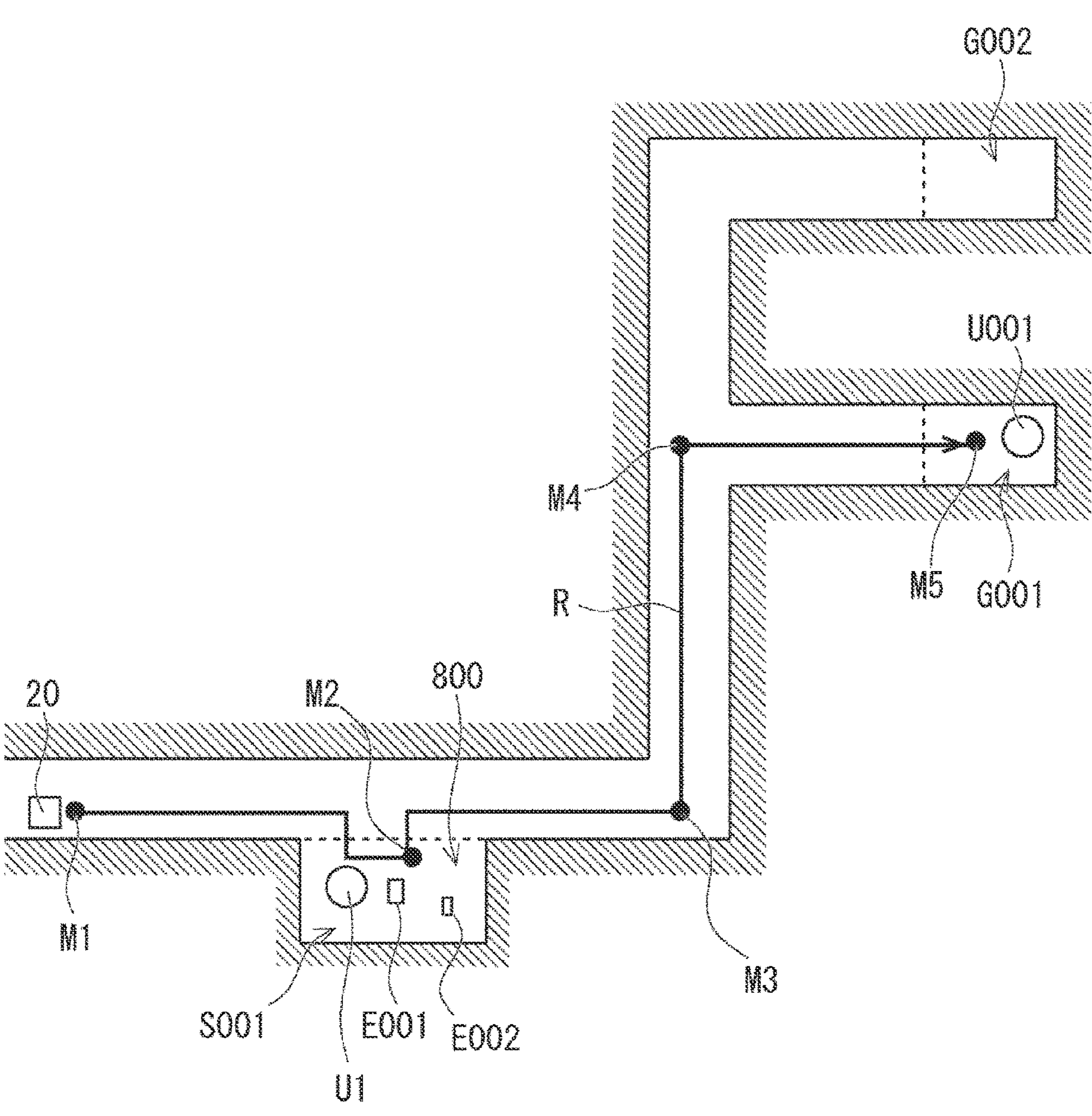
FIG. 8 is a diagram illustrating an example of a moving path of a mobile robot.
Figure 9:
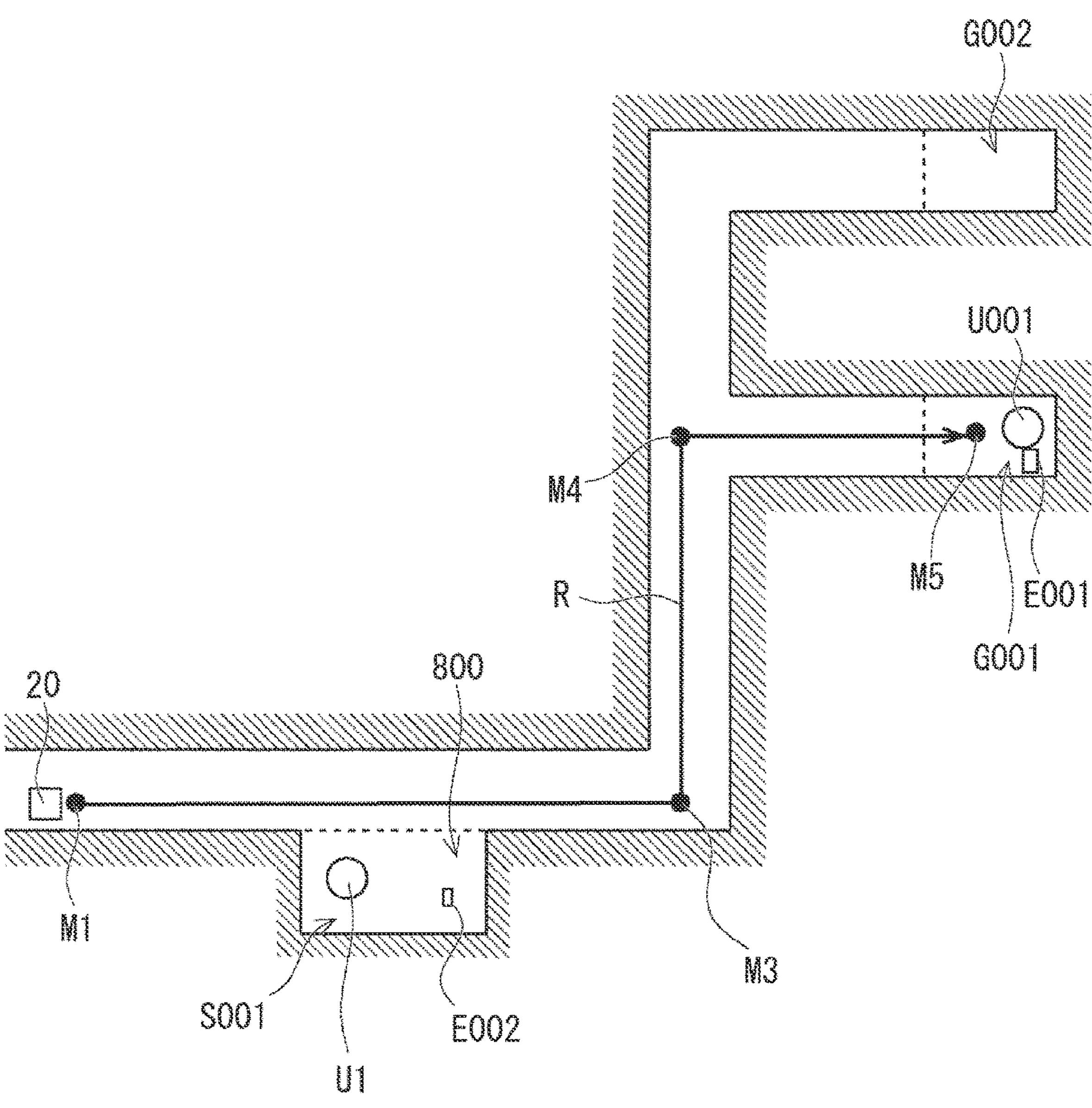
FIG. 9 is a diagram illustrating another example of a moving path of the mobile robot.

An example of the processing of the transport system 1 according to the present embodiment will be described by taking as an example a case where the information illustrated in FIG. 6 is stored as the device lending information 324 and the temporary reservation information 325. FIG. 6 is a table showing an example of the device lending information 324 and the temporary reservation information 325, and FIG. 7 is a table showing an example of the conveyed object information 126. FIG. 8 and FIG. 9 are diagrams illustrating an example of a moving path of the mobile robot.

As illustrated in FIG. 6, the device lending information 324 and the temporary reservation information 325 may include a ID (device control number) of the rental device, a name, necessity of maintenance, a maintenance person type (or maintenance person), a transportation destination (use location), a scheduled user, a use starting time, and a use ending time, as well as information indicating whether formal loan or temporary reservation is made. As illustrated in FIG. 6, these pieces of information can be linked by a loan management number and managed as a table. Of course, the use start time and the use end time included here refer to the scheduled use start time and the scheduled use end time, respectively, but the devices that have started use and the devices that have been returned can be updated to the actual use start time and the use end time, respectively. By performing such updating, it is possible to improve the accuracy of prediction using the result of learning. Note that the distinction between the device lending information 324 and the temporary reservation information 325 can be made by information indicating whether a formal loan or a temporary reservation is made.

The conveyance destination indicates a notification destination (use location) of the loan device, and can be extracted from the loan request information together with the use start time and the use end time. The prospective user indicates a person who uses the rental equipment. For example, the expected user may be the name or ID of the subject, or the name or ID of a staff member such as a nurse, doctor, or the like. Of course, the prospective user may include information of both the patient and the personnel. Information on the necessity of maintenance and information on the type of maintenance person (or maintenance person) may be information indicating whether or not maintenance is required for the respective lending equipment (in this case, essential or optional), or information indicating the type of maintenance person in the case of maintenance (or information indicating ID and name of the maintenance person).

As described above, the device lending information 324 and the temporary reservation information 325 are generated based on the lending request information and the lending temporary reservation information, respectively, and are generated by referring to the device information 323 and the maintenance person information 322 at this time. Note that the information of the maintenance person type or the maintenance person in the maintenance person information 322 or the device lending information 324 is necessary when the maintenance person is notified, and thus is not necessary in an example in which the notification is not performed.

As illustrated in FIG. 7, the conveyed object information 126 may include a device management number, a name, necessity of maintenance, a maintenance person type (or maintenance person) indicating a notification destination, a conveyance source, a conveyance destination, a scheduled user, a robot ID in charge of conveyance, a status, a use starting time, and a use ending time. The conveyed object information 126 does not include information corresponding to the temporary reservation information 325. As illustrated in FIG. 7, these pieces of information can be linked by a transport management number and managed as a table. Of course, the use start time and the use end time included here refer to the scheduled use start time and the scheduled use end time, respectively, but for the devices whose use is started and the returned devices whose status is conveyed can be updated to the actual use start time and the use end time, respectively. By performing such updating, it is possible to improve the accuracy of prediction using the result of learning. Further, as described above, the status may also include information indicating whether it is a conveyance for lending or a conveyance for return.

The transfer source indicates a location where the mobile robot 20 is to mount the lending device. The conveyance destination indicates a notification destination (use place) of the loan device. Note that, although an example is given in which one storage place is used as the conveyance source, it is needless to say that the storage place is not limited to one place, and the conveyance destination is not limited to two places. However, the conveyance source and the conveyance destination of the conveyed object information 126 are the lending destination and the return destination, respectively, when the apparatus is returned. The prospective user indicates a person who uses the rental equipment. For example, the expected user is the name or ID of the subject. Alternatively, the prospective user may be the name or ID of a staff member such as a nurse or a doctor. Of course, the prospective user may include information of both the patient and the personnel.

The conveyed object information 126 may be generated based on the conveyance request information as described above. Thus, the conveyed object information 126 can be generated based on information including the device lending information 324 (and information about other conveyed objects) and the mobile robot 20 determined based on the information in consideration of the execution efficiency of the task. Further, the conveyed object information 126 can be generated by the route planning unit 115 on the basis of the information obtained by the route planning unit 115 for the returned lending device. Specifically, the conveyed object information 126 regarding the lending device to be returned may be generated based on information including the lending device to be returned related to the end time prediction result input to the learned model 124 by the route planning unit 115 and the mobile robot 20 determined in consideration of the execution efficiency of the task based on the acquired collection route.

In the conveyed object information 126, the robot ID is ID of the mobile robot 20 in charge of conveyance of the lending device. The robot ID is set based on the route planning considering the performance of the task. The status is information indicating whether the lending device is in the pre-conveyance state, the conveyance state, or the conveyance state. The status is updated at the time when the mobile robot 20 mounts the lending device and at the time when the receipt of the lending device is completed.

Then, the conveyed object information 126 is transmitted to each of the mobile robots 20 in charge of conveyance of the lending device. For example, the conveyed object information 226 of the mobile robot 20 includes information related to a lending device in charge of conveyance by the mobile robot 20. That is, the conveyed object data of the rental device having the robot ID "BBB" may not be transmitted to the mobile robot 20 having the robot ID "AAA".

The transportation of the lending device E001 of FIGS. 6 and 7 will be described referring to FIGS. 8 and 9. In FIG. 6 and FIG. 7, for the sake of convenience, the time display is set as the day, but it is actually managed by the date and time (date and time). This is because, for example, some devices are rented out over several days or months. In order to initiate transportation from the storage location 800 (S001), FIG. 7 shows an exemplary route setting. Further, the route itself is determined by the route planning unit 115 as described above, and is set in the corresponding mobile robot 20.

With respect to the transfer control number 001, as illustrated in FIG. 8, the mobile robot 20 (robot ID: AAA) first moves from the passing point M1 indicating the current point in time toward the passing point M2 which is the storage location 800 of the lending device E001. After that, the mobile robots 20 receive the lending device E001 at the storage location 800, and then move the passing-point M3, M4 in order to become the route R that goes to the transfer destination G001 (M5). In the transfer destination G001, the scheduled user U001 receives the lending device E001. It should be noted that the mobile robot 20 can then move as needed for other tasks.

The lending device E001 is to be used up to the end-of-use period of 15:30 at the transfer destination G001. However, the end-of-use time described herein is scheduled and can be updated according to the output from the learned model 120. Alternatively, the end-of-use time may be stored as an output result predicted and output by the learned model 120 at the stage described. Thereafter, the lending device E001 is returned, but since the lending device E001 is a device requiring maintenance, the return destination can be, for example, the storage location 800.

Then, the route planning unit 115 inputs the estimated end-of-use times of the lending device E001 returned and conveyed from the conveyance source G001 to the storage location 800 to the learned model 124 and acquires the collection route. Further, the route planning unit 115 determines the mobile robot 20 that collects, for example, the mobile robot 20 that is in the vicinity of the transfer destination G001. When returning the lending device E001, another mobile robot 20 (for example, a robot ID: BBB) can be used. It should be noted that the return of the lending device E001 may be determined by a staff member such as a healthcare staff member, and may be requested to be transported to the storage location 800. On the other hand, a lending device that does not require maintenance or is optional can be transported to the next transport destination and used, and in this case, a staff member such as a medical staff member determines the next transport destination and makes a transport request to the next transport destination.

In this way, the mobile robots 20 and the collection routes for returning the lending device E001 are determined. Then, as illustrated by the route R in FIG. 9, the mobile robot 20 moves from the passing-point M1 indicating the current point in time toward the lending device E001 use location G001 and receives the lending device E001 at the use location G001. In the use location G001, a user such as a scheduled user U001 mounts the lending device E001 on the mobile robot 20. After receiving the lending device E001, the mobile robot 20 returns to the storage location 800, and the route R in FIG. 9 and the route until the completion of the subsequent return can be acquired and determined as a collection route in the route planning unit 115. It should be noted that the mobile robot 20 can then move as needed for other tasks. The same applies to the transfer and return of the lending device E002 and other lending equipment in FIGS. 6 and 7.

Conveyance Processing of this Embodiment

Figure 10:
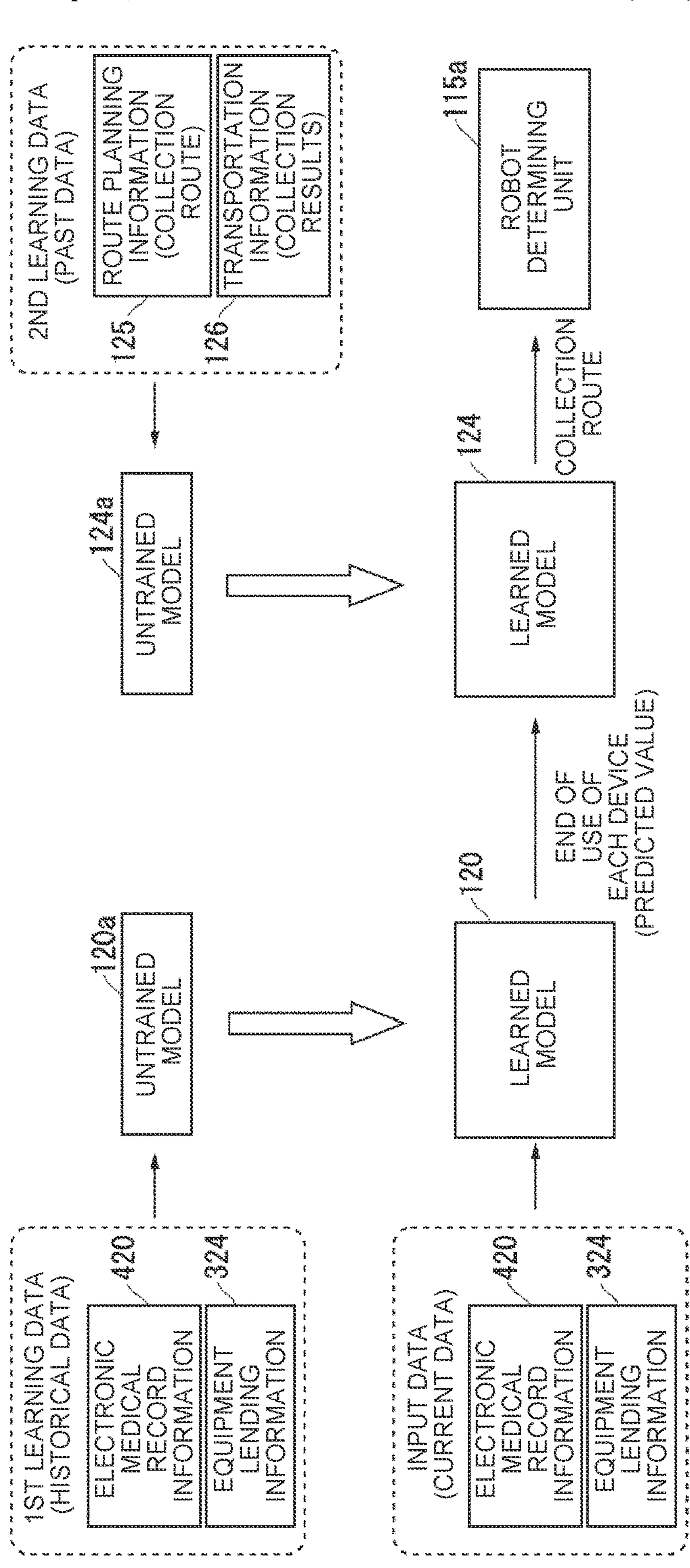
FIG. 10 is a schematic diagram for explaining an example of a conveyance process in the higher-level management apparatus of FIG. 2.

An example of the conveyance processing of the present embodiment in the transport system 1 as described above will be described with reference to FIG. 10 and FIG. 11. FIG. 10 is a schematic diagram for explaining an example of a transfer process in the host management device 10 of FIG. 2, and FIG. 11 is a diagram illustrating an example of a collection route acquired in the transfer process of FIG. 10.

In the transport system 1 according to the present embodiment, as described above, the electronic chart information 420 is stored (registered) in the electronic medical record system 40, and information on some or all of the items of the electronic chart information 420 can be transmitted to the host management device 10 or can be acquired from the host management device 10.

Further, in the transport system 1 according to the present embodiment, as described above, the management information including the lending schedule (including the use start time and the use end time), the use location, and the inventory status is stored (registered) for each of the lending devices conveyed as the conveyed object by the mobile robot 20. This management information can be stored as part or all of the device lending information 324 and the temporary reservation information 325 in the storage unit 32 of the device lending system 30, and can be stored as part or all of the conveyed object information 126 in the storage unit 12 of the host management device 10.

As illustrated in FIG. 10, the end time prediction processing unit 110 inputs, into the learned model 120 stored in the storage unit 12, the device data being lent such as the conveyed object information 126 and the electronic medical record data such as the electronic chart information 420, and acquires an end time prediction result that is a prediction result (prediction value) obtained by predicting the end time of use of each medical device from the learned model 120.

Here, the conveyed object information 126 is exemplified as the equipment data being lent which is input at the end time prediction time. However, this is because the conveyed object information 126 includes information related to the conveyed apparatus if any, and information related to the conveyed apparatus if any. However, in this case, the information of the medical device that has been returned in the conveyed object information 126 has been deleted by updating, or the end time prediction processing unit 110 removes the information of the returned medical device and then inputs the information to the learned model 120. Here, the returned medical device may include a medical device that is mounted on the mobile robot 20 or the like and whose return is started. Further, when the conveyed object information 126 includes a conveyed object that is not a lending target, the end time prediction processing unit 110 removes the information and then inputs the information to the learned model 120.

Alternatively, the in-rental device data input at the end time prediction time may be, for example, the device lending information 324 in the device lending system 30. The end time prediction processing unit 110 receives, for example, the data of the table in FIG. 6, removes the information on the temporary reservation, and then inputs the information to the learned model 120.

In addition, as described above, the in-rent device data input at the end time prediction time is not limited to the data indicating the existing non-returned or non-returned medical device, that is, the data indicating the list of the rental devices. For example, one or a plurality of pieces of currently rented device data input at the time of prediction may be designated by a staff member from the user terminal 400 with reference to the device lending information 324 in the device lending system 30 or the conveyed object information 126 in the storage unit 12. In this case, the end time prediction processing unit 110 inputs information on the medical device being lent designated by the user terminal 400 to the learned model 120.

Even in the case of any input example, the information on the medical device being lent to be input to the learned model 120 may include the use start time, and in particular, the use start time may be the scheduled use start time, but it is possible to accurately predict the information updated at the time when the use is started.

In addition, information indicating the necessity of use of the medical device shall be described in the input electronic medical record data. The information includes information indicating a surgery necessary for the patient, information indicating a symptom of the patient, information indicating a treatment to the patient, information indicating the medical device itself, and the like, or information obtained by combining a plurality of pieces of the information. Therefore, in a case where information indicating the necessity of use of the medical device is described metaphorically or directly in the electronic chart information 420 as illustrated in the procedure of FIG. 5, the input electronic medical record data corresponds to data of the electronic chart information 420 itself or data including a description of the electronic chart information 420.

However, the electronic medical record data input to the end time prediction processing unit 110 for the end time prediction may be current electronic medical record data. That is, the electronic chart information 420 may be data excluding information about the medical device that has been returned after the lending has been completed.

The information obtained by the end-time prediction processing unit 110 predicting the end-of-use time of a certain medical device may include, for example, information indicating a medical device, information indicating a use location, and a predicted end-of-use time. For example, the end time prediction processing unit 110 can output the infusion pump E002, the use location G001, and "2021/10/5 14:00" as the use end predicted date and time. Note that the exemplified predicted use end date and time is the same as "2021/10/5 14:00" described as the scheduled use end time in the table of FIG. 6 or FIG. 7, but, of course, since it is a prediction result, a prediction result different from the scheduled use time of these tables may be obtained. Further, although only one medical device has been exemplified here, as has been described with respect to the currently-lent device data input at the time of prediction, the end time prediction processing unit 110 can simultaneously predict the end time of use of other medical devices being lent and output the result.

Further, the type of information predicted as the end time prediction result can be changed by performing a predetermined process such as changing the setting of the output parameter or the like at the time of generating the learned model 120. For example, in a case where the actual use start time is included in the data input to the learned model 120, the end time prediction processing unit 110 can finally add the value to be output as the elapsed time from the use start time to obtain the use end predicted date and time.

The learned model 120 will now be described. As illustrated in FIG. 10, the learned model 120 is a model that is machine-learned by inputting first learned data, which is historical data, into the non-learned model 120*a*. Specifically, as described as processing in the end time prediction processing unit 110, the learned model 120 is a model that is machine-learned so as to output an end time prediction result by inputting electronic medical record data describing information indicating the lending device data indicating the medical device being lent and the necessity of use of the medical device using the first learning data. The learned model 120 may be updated by relearning at any time.

The first learning data is teacher data including loan result data and electronic medical record data, as exemplified by the device lending information 324 and the electronic chart information 420, respectively. However, the device lending information 324 and the electronic chart information 420 exemplified as the first learning data may be separately stored as past data as described below.

The lending result data included in the first learning data may be data indicating a lending result including a result of lending the medical device and a result of ending the use of the medical device. As a result of ceasing the use of a medical device, it may include information indicating the timing of the end of the use of that medical device, and instead may employ information indicating the timing of the return of that medical device as information. This information in the loan result data corresponds to, for example, information indicating the end time of the treatment in the electronic medical record data.

Therefore, the lending record data may include, for example, information about a medical device that has been transported in the device lending information 324 and that is a storage location (storage location 800 (S001) in FIG. 8) as a transport destination, and may also include information about a medical device that is being transported if the transport destination is a storage location. As described above, the lending record data is data including information indicating the record returned by lending only, the record returned, and the record in which the return is started. For example, the loan result data may be data about the medical device that has been returned (and the return start) out of the device lending information 324, and in practice, the data may be stored as a history in the past separately from the device lending information 324. Here, the learned model 120 may be configured to output a prediction result in consideration of the time for preparing for return as the end time prediction result, and in this case, the end-of-use time indicated by the lending result data may be, for example, the time for which the preparation for return has been completed.

With reference to FIG. 6, lending performance data will be exemplified. As the loan result data, for example, among the device lending information 324 and the temporary reservation information 325 illustrated in FIG. 6, there may be no record corresponding to the temporary reservation information 325 (in this example, the record of the loan management number 003). There is no need for the type of maintenance personnel (or maintenance personnel). Further, the loan result data may not further include a user or a treatment person who is a person who actually used or treated in response to the prospective user or the prospective treatment person, and may not include the necessity of maintenance. However, by including the necessity of user or treatment person and maintenance, it is possible to make a prediction considering the progress or delay of collection, etc. caused by the user or treatment person, etc. and to make a prediction considering the non-lending time, etc. when maintenance is necessary. Note that the lending record data can also be obtained by separately accumulating information that has been returned from the conveyed object information 126.

However, the loan result data may also include temporary reservation information 325. Specifically, as described above, the device lending system 30 may include a reservation system for provisionally reserving a rental of a medical device, and in such a configuration, the rental result data may include data in which information indicating a medical device provisionally reserved by the reservation system exemplified by a part or all of the temporary reservation information 325 and information (a part of the device lending information 324) indicating a result of actually lending based on the provisional reservation (a result of lending for at least a medical device that has started returning) are associated with each other. As a result, the learned model 120 can predict the end-of-use time of the medical device in advance in response to the temporary reservation in the device lending system 30.

Further, the device lending system 30 may determine the lending for the temporarily reserved medical device or for the medical device for which a new lending request has been made separately, based on the information indicating the temporarily reserved medical device that is the current non-lending state exemplified by the temporary reservation information 325 and the acquired end time prediction result. Here, the loan decision can refer to a loan schedule decision in which there is no duplication of loans. Further, as described above, the learned model 120 may be configured to output a prediction result in consideration of the time for preparing for return as the end time prediction result, or may be further configured to predict and output the time required for return. In either configuration, lending can be performed on a more efficient schedule, particularly by using the configuration that determines the lending schedule.

The electronic medical record data included in the first learning data is the same item of information as the electronic medical record data input at the end time prediction time, but is not the current electronic medical record data but is past electronic medical record data in which information indicating the necessity of use of the rented medical device is described. Here, the rented medical device may include not only the medical device that has been returned but also the medical device that has started the return (the medical device that is being transported for return).

The description of the prediction processing by the end time prediction processing unit 110 is returned.

The end time prediction processing unit 110 may be configured to notify the device lending system 30 of the obtained end time prediction result via the communication unit 14. This notification can be executed via the communication unit 14 by a notification processing unit (not shown) included in the end time prediction processing unit 110. The notification content includes the target medical device and the predicted date and time of end of use, and if the prediction is made for a plurality of medical devices, information on any of them may be included.

Upon receiving the notification, the device lending system 30 notifies, for example, at least one of the administrator, the lending staff, and the staff in charge such as the staff in charge of the return work. The notification destination may be registered in advance as an e-mail address, a number of a short message, or the like in the storage unit 32. Incidentally, a device lending system can be constructed including these notification destinations, and in this case, these notification destinations become notification destinations by the end time prediction processing unit 110.

With such a configuration, the host management device 10 can predict the end time of use of the medical device in the device lending system 30 in advance and obtain the prediction result, rather than being determined by the staff or the like of the lending destination. In fact, when a medical device is lent from a storage location to each use location in a hospital, a demand for lending of a medical device cannot be predicted in advance, and therefore, an inventory shortage occurs when the demand suddenly increases. One reason why the medical equipment to be lent out of stock is that the staff of the lender judges that the use of the medical equipment is completed at the lender, but the return transportation is carried out, so that the stay time is generated.

However, in the host management device 10 according to the present embodiment, it is possible to predict the end of use time of the medical device in advance based on the past loan result data and the electronic medical record data. For example, since staff such as a doctor or a nurse actually judge the period of use of the medical device according to the symptoms of the patient and the progress of the treatment, it is possible to predict the end of use time in advance based on the past electronic medical record data and the loan result data which is the past use result. In particular, it is possible to accurately pre-predict the end-of-use time of the medical device used for the treatment, for a treatment in which the period of use can be imagined to some extent by the amount of liquid and the injection speed, for example, by infusion. On the other hand, with respect to a medical device used for a procedure that is difficult to imagine in the time required for the procedure, it is possible to accurately perform the pre-prediction by using the learned model 120 in which many cases are learned. Further, in order to improve the prediction accuracy as needed, the accumulated data may be relearned and the learned model 120 may be updated.

Thus, in the device lending system 30, it is possible to take measures to shorten the residence time from the end of use until the return is completed as much as possible, and as a result, it is possible to suppress the residence time, that is, to shorten as much as possible, it is possible to lead to a reduction in inventory shortage. As the countermeasure, for example, the staff of the notification destination as described above arranges the conveyance for return immediately using the user terminal 400, or the host management device 10 automatically sets the conveyance for return immediately.

Further, as described above, the loan record data and the in-rent device data or the electronic medical record data may include staff information indicating at least one of a staff member who uses the medical device and a group to which the staff member belongs. Although it is assumed that the time required for the treatment is actually different depending on the responsible staff and the group, by using the staff information in this way, the host management device 10 performs the prediction in consideration of the action of the responsible staff, it is possible to more accurately predict the end time of use of the medical device in advance.

Further, the end time prediction processing unit 110 passes the acquired end time prediction result to the route planning unit 115, and uses the result to generate a collection route for collecting the medical device as a returned product in order to suppress the above-described staying time. This collection route is described.

In the transport system 1 according to the present embodiment, as described above, the end time prediction result can be obtained. Then, in order to generate a collection route which is a transport route at the time of collection, as shown in FIG. 10, the route planning unit 115 inputs the end time prediction result to the learned model 124, and acquires a collection route for collecting the medical device to be collected in the end time prediction result as a returned product. The input end time prediction result may include information indicating, for example, a lending destination indicating a collection point, a start date and time of collection, a staff member in charge of performing collection work such as performing work of mounting a lending device on the mobile robot 20, and the like, and may also include information indicating a device to be collected.

The learned model 124 will now be described. As illustrated in FIG. 10, the learned model 124 is a model that is machine-learned by inputting second learned data, which is historical data, into the non-learned model 124*a*. Specifically, as described as processing in the route planning unit 115, the learned model 124 is a model that is machine-learned so as to output a recovery route that is collected by the mobile robot 20 by inputting an end time prediction result that is a result of predicting the end time of use of the lending device being lent using the second learning data and using the lending device being lent as a return product. The learned model 120 may be updated by relearning at any time.

The second learning data is teacher data including the collection result data and the collection route data, as exemplified by the conveyed object information 126 and the route planning information 125, respectively. However, the route planning information 125 and the conveyed object information 126 exemplified as the second learning data may be separately stored as past data as described below.

The collection result data included in the second learning data may be data indicating a collection result including a use end time when the use of the lending device is completed and a collection completion time when the lending device is collected as a returned product after the lending device is lent. Here, the end of use time may be the end of use date and time. Further, the collection completion time may be a collection completion date and time, and may be a date and time (transport completion date and time) when the lending device is transported to the storage place or the next lending place, but may be, for example, a transport start date and time when such transport is started.

Therefore, the collection result data can include information on, for example, a medical device that has been transported and the transport destination is a storage location (storage location 800 (S001) in FIG. 8) among the medical devices indicated by the conveyed object information 126, and a medical device that is a transported record and in which another record whose transport destination is the transport source exists. As described above, the collection result data is data including information indicating a result of being lent back. For example, the collected result data may be data about a medical device that meets such a condition in the conveyed object information 126. In practice, this data can be stored separately from the conveyed object information 126 as a history of the past.

The collection result data is exemplified with reference to FIG. 7. As the collection result data, for example, the maintenance person type (or maintenance person) is unnecessary in the conveyed object information 126 illustrated in FIG. 7. Further, the collection result data may not include a user who is an actual user corresponding to the scheduled user, but by including the user, it is possible to predict the progress or delay of the collection or the like caused by the user. In this case, the prediction can be executed by including the information indicating the responsible staff in the input end time prediction result.

The collection route data included in the second learning data may be data indicating a collection route collected by the mobile robot 20. This collection route is exemplified by route planning information 125 and may include a transit point including a departure point and a destination. The place of departure here is the borrower, and the destination is the storage place, maintenance place, or the next borrower.

The process performed by the route planning unit 115 will be described again.

As described above, the route planning unit 115 inputs the end time prediction result to the learned model 124 to acquire the collection route, and determines the mobile robot 20 that collects the rental equipment by the collection route. That is, the route planning unit 115 executes a process of determining the mobile robot 20 to be controlled in order to collect the lending devices. This determination can be executed by the robot determination unit 115*a* provided in the route planning unit 115.

For example, the robot determination unit 115*a* may determine the mobile robot 20 based on the predetermined condition. The predetermined condition may be, for example, a condition in which a task can be efficiently executed as the entire system, such as being present at or near the transfer source, or uniformizing the degree of deterioration of the mobile robot 20.

With such a configuration, the host management device 10 can efficiently suppress the residence time from the end of use until the completion of the return by the mobile robot 20 for the device to be lent in the device lending system 30.

Specifically, this effect will be described. When a medical device is lent from a storage location to each use location in a hospital, a demand for lending of a medical device cannot be predicted in advance, and therefore, an inventory shortage occurs when the demand rapidly increases. One factor that leads to a shortage of inventory of lending equipment, or a problem in the management of lending equipment, is that staying time occurs because the staff of the lending party determines that the use of the equipment has been completed at the lending party, but that the return transportation is to be carried out. The reason why the staff of the borrower makes a judgment is that, for example, the medical device exemplified here is a medical device, in some wards there are situations where loading can be carried out immediately due to a shortage of personnel or the presence of an emergency patient, and situations where loading cannot be carried out. However, since the host management device 10 determines the collection route by using the learned model 124 that has machine-learned such a situation, it is possible to shorten the residence time as much as possible.

In addition, when the mobile robot is used as a means for collecting the returned product, the mobile robot may pass through a route where a general patient exists, and thus the congestion state of the route varies depending on the time zone. For example, in a route traveling in a place where there are many people waiting for inspection, it takes time to travel compared to a route where there are fewer or no people waiting for inspection, and therefore it takes time to collect. Further, since the business load of the base to be collected also changes according to the time zone, the time required for collection changes according to the order of the passing route and the point to be collected. In addition, when a mobile robot is used as a means for collecting a returned product, it is desired to realize reduction in deterioration and power saving as much as possible.

On the other hand, in the host management device 10, although the mobile robot 20 is used to collect the returned product, the collection route can be calculated in consideration of such a difference in collection time, such as minimizing the time required for collection by automatically selecting the collection route based on the end-of-use prediction of the device and performing collection. In addition, the host management device 10 can realize at least one of appropriately selecting a recovery route and appropriately selecting the mobile robot 20 that performs recovery in consideration of the degree of deterioration and power consumption of the mobile robot 20. The former can be realized by using the recovery result data obtained by considering the degree of deterioration and power consumption of the mobile robot 20 in the setting of the recovery route.

As described above, in the host management device 10, it is possible to suppress the staying time in the efficient use mobile robot and the recovery route in terms of the recovery time, the power consumption and the consumption of the mobile robot 20, and the like. That is, in the host management device 10, it is possible to shorten the recovery time, suppress the deterioration of the mobile robot 20, and save power as much as possible, and it is possible to efficiently suppress the residence time.

In addition, since the determination of the end of use of the medical device is performed by a staff member such as a doctor or a nurse, there is a possibility that the end of use is deviated from the prediction, and the time at which the mobile robot 20 can actually be collected may be changed from the time at which the mobile robot is dispatched. However, in the host management device 10, by updating the learned model 124, which is an algorithm of the collection route plan, based on the past collection result data, the prediction error of the end-of-use prediction is reduced, so that an appropriate collection route can be set.

Here, the device to be lent may be a medical device as exemplified, but is not limited thereto. However, by using the lending device as the medical device, the host management device 10 can efficiently suppress the residence time from the end of use of the medical device until the return by the mobile robot is completed in consideration of the usage mode of the medical device. When the device to be lent is other than the medical device, a system that manages some kind of information related to the device to be lent instead of the electronic medical record system 40, for example, a system that collects and manages a questionnaire that examines the demand for lending of the device, and the like can be provided to obtain the end time prediction result.

Further, the learned model 124 may be a model that is machine-learned so as to output a collection route that allows a plurality of devices to be collected. With reference to FIG. 11, an example of an output result of the learned model 124 will be given of a case where the end time prediction result input to the learned model 124 at the time of prediction of the recovery route includes information indicating a lending destination indicating a recovery point, a start date and time of recovery, and a staff member in charge of performing a recovery operation such as performing an operation of mounting a lending device on the mobile robot 20. More specifically, an example of the output result of the learned model 124 will be given, taking as an example the case where the end time prediction result of the first device used in the ward A and the end time prediction result of the second device used in the ward B are both 16:00 of 2021/10/5.

In this case, the recovery route illustrated in FIG. 11 may be output from the learned model 124. The recovery route in FIG. 11 is a route in which the mobile robot a, which is one of the mobile robots 20, departs from its current location at 16:00 on departure time 2021/10/5 to the ward A, collects the first device in the ward A, moves to the ward B after collection, collects the second device in the ward B, and goes to a return location (for example, a storage location). In the example of FIG. 11, information indicating an estimated value of the start time and an estimated value of the required time at each timing is also included in the collection route.

However, the value output from the learned model 124 may be, for example, only an estimated value of the required time. In the collection route illustrated in FIG. 11, the collection start time of the first ward can be calculated as the sum of the departure time of the mobile robot 20 and the travel time to the first ward, and the collection start time of the subsequent ward can be calculated as the sum of the collection start time of the previous ward, the collection required time which is the predicted result, and the travel time between the wards. In either case, the travel time can be calculated based on the travel distance and the travel speed of the mobile robot 20, and more specifically, can be calculated based on the travel distance and the travel speed for each section of the route.

As a result, the host management device 10 can acquire an efficient recovery route for recovering a plurality of devices, and thus can more efficiently suppress the residence time from the end of use of the plurality of devices until the completion of the return by the mobile robot 20. That is, with such a configuration, in the host management device 10, when the mobile robot 20 collects the rental equipment from a plurality of points in the medical institution, it is possible to minimize the time required for recovery by appropriately selecting the recovery route.

In addition, the above-described collection result data may include first information that is at least one of a time required for collection by the mobile robot 20, a moving distance of the mobile robot 20, and power consumption of the mobile robot 20. In this case, the learned model 124 may be generated as a model in which machine learning is performed so as to output a recovery route that minimizes the value indicated by the first information. For example, the learned model 124 may generate, as the teacher data, a data set in which a difference between the plan of the collection route and the collection result is equal to or less than a predetermined value with respect to the first information. Furthermore, the collection route output in this case may also include a predicted value of the first information, as exemplified in FIG. 11 as the required time (exemplified in FIG. 11 as an individual required time).

In the case of this example, the host management device 10 acquires a collection route in consideration of past collection result data including the first information from the prediction result of the end-of-use time for the rented device, and determines the mobile robot 20 serving as a collection subject. Therefore, in the host management device 10 having such a configuration, it is possible to recover the device through a recovery route that can be said to be efficient in terms of at least one of the time, the travel distance, and the power consumption, and as a result, it is possible to efficiently suppress the residence time from the end of use of the device until the return by the mobile robot 20 is completed from the above-described viewpoint.

Alternatively, the learned model 124 may be generated as a model in which machine learning is performed so as to output a recovery route for recovering a plurality of devices so as to minimize the first information when the recoverable time at the recovery point for the plurality of devices is within a predetermined time. For example, the learned model 124 may be generated as a model that outputs a recovery route that minimizes the value indicated by the first information when the predicted return time of the plurality of points is within a predetermined period. Furthermore, also in this case, a predicted value of the first information may be included in the output recovery route.

In the case of this example, the host management device 10 acquires a collection route that can collect a plurality of devices in consideration of past collection result data including the first information from the prediction result of the end-of-use time for the rented device, and determines the mobile robot 20 that is a collection subject. Therefore, in the host management device 10 having such a configuration, it is possible to collect a plurality of devices by a recovery route that can be said to be efficient from at least one of time, a moving distance, and power consumption, and as a result, it is possible to efficiently suppress the residence time from the end of use of the plurality of devices until the return by the mobile robot 20 is completed from the above-described viewpoint.

In addition, regardless of whether or not a condition such as a case within a predetermined time is adopted, the first information can be appropriately changed from, for example, a moving distance to power consumption by user setting, and thus a recovery route under a condition desired by the user can be set. In this case, such a change can be made by generating the learned model 124 for each combination of the first information or by including information specifying the first information as one of the input parameters to the learned model 124. In addition, when the output recovery route includes the predicted value of the first information, such a change corresponds to a change in the output value.

Note that an example in which the end time prediction result is input from the end time prediction processing unit 110 to the route planning unit 115 has been described, but the present disclosure is not limited thereto, and a configuration in which the end time prediction result obtained by another means is input to the learned model 124 may be employed. In other words, the prediction of the end time prediction result can be performed in another system, and in a simpler example, the end time predicted by a staff member such as a medical staff member can be input from the user terminal 400 or the like.

Figure 12:
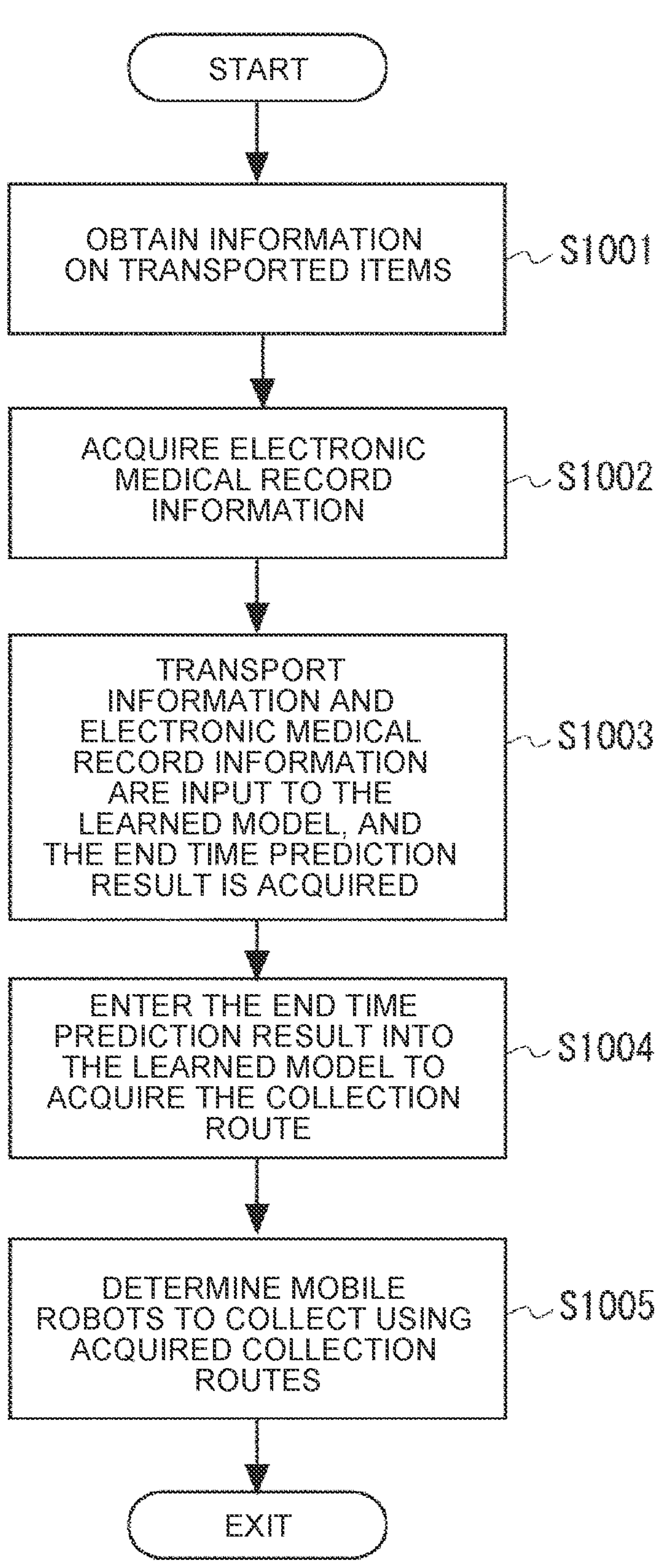
FIG. 12 is a flowchart illustrating an example of a conveyance method according to the present embodiment.

Next, an example of the flow of the conveying method according to the present embodiment will be briefly described with reference to FIG. 12. FIG. 12 is a flowchart illustrating an example of a conveyance method according to the present embodiment.

First, the host management device 10 acquires the conveyed object information 126 by reading the conveyed object data from the storage unit 12 (S1001). The host management device 10 acquires the electronic chart information 420 by receiving it from the electronic medical record system 40 (S1002). Note that the order of S1001, S1002 of steps is not limited. Further, the information acquired in both steps is information related to at least a medical device that has not been returned or has not been returned yet, as described above.

Next, the host management device 10 inputs the acquired device lending information 324 and the electronic chart information 420 to the learned model 120, and acquires the end-time forecast (S1003). Further, in the step S1001, the host management device 10 acquires the device lending information 324 by receiving the device lending data from the device lending system 30. Then, the host management device 10 can acquire the predicted end-time by inputting the information to the learned model 120 instead of the conveyed object information 126 in the step S1003.

Next to S1003 of steps, the host management device 10 enters the end-time forecast into the learned model 124 and acquires a collection route (S1004). Note that the collection route acquired here may be for a plurality of devices. Then, the host management device 10 determines (S1005) the mobile robots 20 to be collected by the collection route, and ends the process. Such processing may be performed for all the devices being lent, but may also be performed for each device being lent, for example. After S1005 of steps, the host management device 10 controls the determined mobile robots 20 to execute recovery.

Learning System

Figure 13:
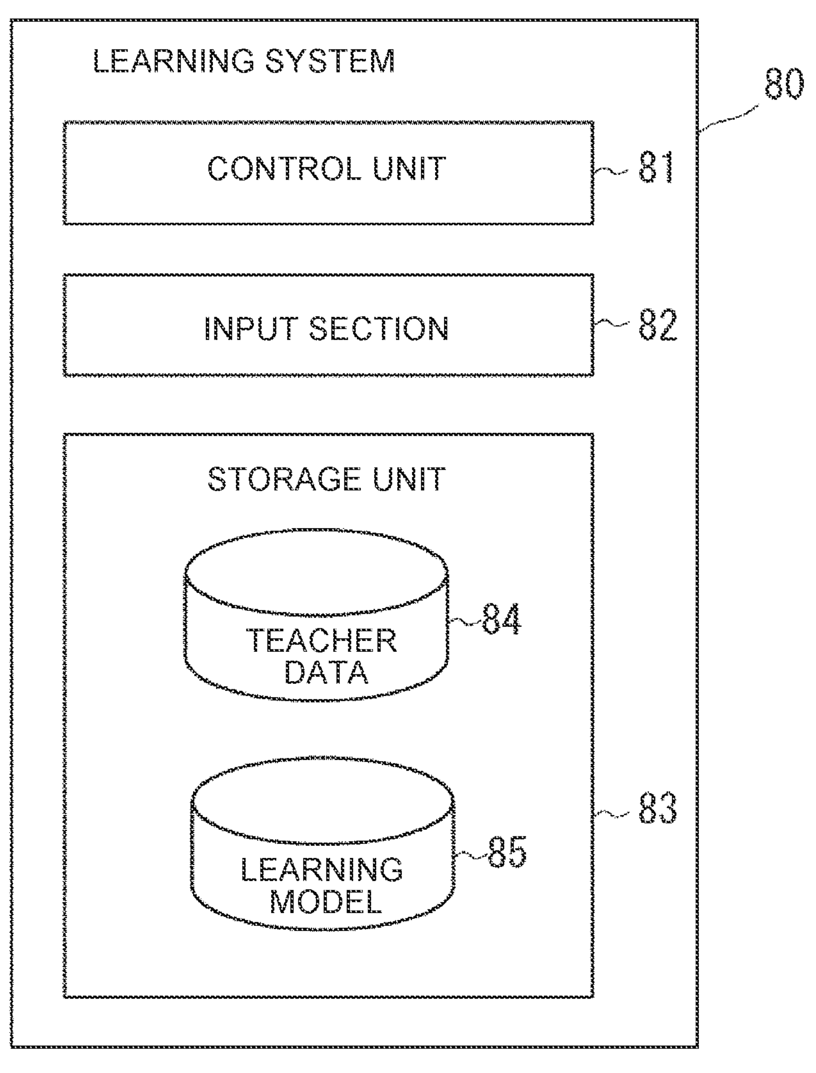
FIG. 13 is a block diagram illustrating a configuration example of a learning system that generates a learned model used in the upper management apparatus of FIG. 2.
Figure 14:
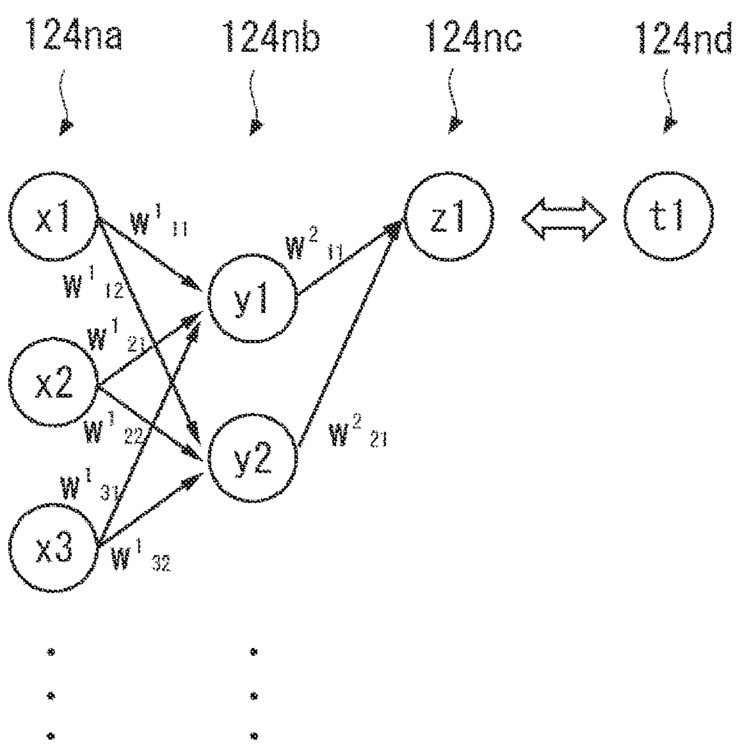
FIG. 14 is a schematic diagram illustrating an exemplary learned model generated by the learning system of FIG. 13.

Referring to FIGS. 13 and 14, a configuration example of the learning system that generates the above-described learned model 124 and a processing example (an example of a learning method) in the learning system will be described. FIG. 13 is a block diagram illustrating a configuration example of a learning system that generates a learned model 124 used in the host management device 10 of FIG. 2. FIG. 14 is a schematic diagram illustrating an example of the learned model 124 generated by the learning system 80 of FIG. 13. Note that the non-learning model 124*a* is similar to the configuration shown in FIG. 14, but is a model in which the weighting factor is not determined.

The learning system 80 illustrated in FIG. 13 may include a control unit 81, an input unit 82, and a storage unit 83. The learning system 80 can be constructed by using a computer such as an Artificial Intelligence (AI) PC for learning. However, the learning system 80 may be configured by a single apparatus or may be configured by distributing functions among a plurality of apparatuses.

The control unit 81 controls the entire learning system 80. The control unit 81 can be realized by, for example, an integrated circuit. The control unit 81 can be realized by, for example, a processor, a working memory, a nonvolatile storage device, and the like. The control program executed by the processor is stored in the storage device, and the function of the control unit 81 can be performed by the processor reading the program into the working memory and executing the program. The control program includes a learning program for executing learning. Note that the storage unit 83 can also be used as the storage device.

The input unit 82 can be constituted by at least one of an interface that performs an input operation of data, and a communication interface that inputs data from an external device by communication. The input unit 82 inputs a data set of learning data (teacher data) 84 necessary for learning, and stores the data set in the storage unit 83 so as to be referred to at the time of learning. The storage unit 83 may store the teacher data 84, and may store a learning model 85 as an untrained model.

In the processing by the learning system 80, the control unit 81 may input the teacher data 84 to the learning model 85 as the non-learning model, execute the machine learning based on the teacher data 84, and set the learning model 85 as the learned model 124. As described above, the teacher data 84 includes the collection result data and the collection route data as illustrated in the past conveyed object information 126 and the past route planning information 125, respectively. As described above, the learned model 124 is generated as a machine-learned model in which the end time prediction result is input and a collection route is output. With such a configuration, the learned model 124 can acquire a recovery route that efficiently suppresses the residence time from the end of use of the device until the completion of the return by the mobile robot 20.

For example, a neural network 124*n* as illustrated in FIG. 14 may be used as the learning model 85. The neural network 124*n* illustrated in FIG. 14 may include an input layer 124*na*, a hidden layer (intermediate layer) 124*nb*, and an output layer 124*nc*, and may include a value corresponding to the output layer 124*nc* as a correct data 124*nd*. For simplicity of explanation, the intermediate layer 124*nb* is described as one layer, but there may be two or more intermediate layer 124*nb*.

The input layer 124*na* includes an input node that uses each of the explanatory variables x1, x2, x3, . . . as an input parameter. In the node indicated by the value y1 among the intermediate layer 124*nb*, a value obtained by multiplying the input parameter x1 by the weighting coefficient $w^1_{11}$, a value obtained by multiplying the input parameter x2 by the weighting coefficient $w^1_{21}$, a value obtained by multiplying the input parameter x3 by the weighting coefficient $w^1_{31}$, and the like are input, and the sum of the values is calculated. In the node indicated by the value y2 among the intermediate layer 124*nb*, a value obtained by multiplying the input parameter x1 by the weighting coefficient $w^1_{12}$, a value obtained by multiplying the input parameter x2 by the weighting coefficient $w^1_{22}$, a value obtained by multiplying the input parameter x3 by the weighting coefficient $w^1_{32}$, and the like are input, and the sum of the values is calculated. The same applies to other nodes of the intermediate layer 124*nb*.

The output layer 124*nc* includes an output node that uses the objective variable z1 as an output parameter. In the output node indicated by the value z1 in the output layer 124*nc*, a value obtained by multiplying the value y1 by the weighting coefficient $w^2_{11}$, a value obtained by multiplying the value y2 by the weighting coefficient $w^1_{21}$, and the like are inputted, and the sum thereof is calculated and compared with the value t1 of the corresponding correct data 124*nd.*

In accordance with such comparison, the respective weighting factors are calculated so that the comparison result is small, so that the non-learned neural network 124*n* is generated as the learned model 124. That is, when the actual result is given as the correct data 124*nd*, the control unit 81 adjusts the respective weighting factors so as to minimize an error between the value of the output-node 124*nc* of the output-layer z1 and the value t1 of the corresponding correct data 124*nd*, thereby generating the learned model 124.

The teacher data 84 used in generating the learned model 124 may be a data set including the collected actual data and the collected route data, as illustrated by the conveyed object information 126 and the route planning information 125, respectively. For example, a part of the information of each item included in the data set may be input as the input parameter x1, x2, x3, . . . , and the information of the remaining items may be set as the value t1 of the correct data 124*nd*. More specifically, as the explanatory variable, as described above, for example, a lending destination indicating a collection point, a collection start date and time, a staff member in charge of performing a collection operation such as performing an operation of mounting a lending device on the mobile robot 20, and the like are inputted as input parameters, and the information of the required time can be set as the objective variable as the value t1 of the correct data 124*nd.*

The learned model 124 thus generated is updated by updating the results and setting the updated results as correct data 124*nd* so that the respective weighting factors are adjusted so as to minimize an error between the output node of the output layer 124*nc* and the corresponding results. That is, the learning model 85 as the learned model 124 can be relearned based on a newly prepared data set when relearning is required.

When the data set of the above-described example is used, the host management device 10 can acquire the collection route and update the learning model 124 in the following manner.

First, the host management device 10 predicts the end-of-use time of each device by using the learned model 120 or the like, and acquires the end-of-use prediction result. Next, based on the acquired end time prediction result, the host management device determines whether or not the predicted date and time of devices at a plurality of points is within a predetermined time (for example, within 15 minutes), and when the predicted date and time is within a predetermined time, determines that one mobile robot 20 is going to collect a plurality of points. Then, the host management device 10 calculates the pattern of the collection order of the plurality of points according to the concept of the permutation.

Next, the host management device 10 executes the following processing for each calculated pattern. That is, for the collection points included in the patterns, the neural network 124*n* is used, and the collection points, the date and time of the start of the collection, and the personnel in charge are inputted to obtain the required time of the collection operation at the point as the value z1 in the output-layer 124*nc*, thereby estimating the required time in advance. Then, the host management device 10 determines the collection route by selecting the pattern of the collection order in which the estimated required time is shortest. After collection, the learned models 124 are updated by updating the respective weighting factors based on the actual value t1 for the estimated value z1.

Here, the input parameters can be added/deleted as appropriate according to the judgment of the person who constructs the model or the like in order to suppress the deterioration of the prediction accuracy due to the pseudo correlation or the like. In the first route planning, it is assumed that the data is insufficient to obtain the output of the neural network 124*n*, and when the data is insufficient, the shortest path can be determined and planned using, for example, the Dijkstra method.

In addition, the learning process for the learned model 120 can also use the same learning system only because the algorithm, teacher data, and the like are different from each other.

In this case, in the processing by the learning system 80, the control unit 81 may input the teacher data 84 to the learning model 85 as the non-learning model, execute the machine learning based on the teacher data 84, and use the learning model 85 as the learned model 120. As described above, the teacher data 84 includes the loan result data and the electronic medical record data as illustrated in the past device lending information 324 and the past electronic chart information 420. As described above, the learned model 120 is generated as a model that is machine-learned so as to input the on-loan device data and the electronic medical record data and output the end-of-use prediction result that predicts the end-of-use time of the medical device. With such a configuration, the learned model 120 can predict in advance the end of use of the medical device in the device lending system 30.

For example, a neural network 124*n* as illustrated in FIG. 14 may be used as the learning model 85. Hereinafter, for convenience, the learned model 120 will be described by replacing the reference numeral 124 or the like with the reference numeral 120 or the like. In this case, the neural network 120*n* is an example of the learning model 85 for the medical device of one model or model number (management number). As described above, the target medical devices may be handled collectively or individually by the same type of medical devices. Here, the neural network 120*n* is prepared for each type of the medical device or for each model number of the medical device, and machine-learning can be performed. Then, at the time of predicting, the in-lending device data may be used as information for determining which of the plurality of neural network 120*n* after machine learning is to be used.

As described above, the learned model 120 is generated as a different learned model for each type or model number of the medical device, and can be stored as a set of a group of learned models. In this case, the end time prediction processing unit 110 acquires the end time prediction result using a learned model corresponding to the type or the model number indicated by the rented device data as information for determining which type or model number of the medical device to predict. Thus, the host management device can more accurately predict the end-of-use time of the medical device in advance by considering the time required for transportation, end-of-use, preparation for return, and the like for each medical device. Since the end time is different for each medical device, such a configuration is beneficial, and it can be said that such a configuration is beneficial because it is assumed that the prediction accuracy of the end time is also different for each medical device.

In the neural network 120*n*, the non-learned neural network 120*n* is generated as the learned model 120 by comparing the output node indicated by the value z1 in the output layer 120*nc* with the value t1 of the corresponding correct data 120*nd*, and calculating the respective weighting factors so that the comparison result becomes smaller according to such comparison. That is, when the actual result is given as the correct data 120*nd*, the control unit 81 adjusts the respective weighting factors so as to minimize an error between the value of the output-node 120*nc* of the output-layer z1 and the value t1 of the corresponding correct data 120*nd*, thereby generating the learned model 120.

The teacher data 84 used in generating the learned model 120 may be a data set including electronic medical record data and loan result data as described above. For example, information of each item included in the electronic medical record data may be input as an input parameter x1, x2, x3, . . . , and information of each item included in the loan result data may be set as a value t1 of the correct data 120*nd*. For example, the value of the correct data 120*nd* may include a value indicating the period information indicating the use end date and time, and the value of the node corresponding to each of the output layer 120*c* indicates the end time prediction result at the time of prediction (at the time of operation). Further, as described above, the input parameter may include information directly indicating the medical device, but may not include information metaphorically indicating the medical device, such as a symptom or a treatment.

Although the electronic medical record data has been described as a simple example in FIG. 5, the electronic medical record data may include the following items in more detail. For example, the electronic medical record may include, but may not include, the patient ID and/or name, age, gender, etc., identifying the patient, for example, as the patient information. In addition, the electronic medical record data may include, as information related to the hospitalization among the information related to the treatment, a hospitalization date and time, a medical department at the time of hospitalization, an inpatient ward, an attending physician, a nurse in charge, a disease name, a hospitalization purpose, an examination date, an examination name, an operation name, an operation date, and the like. The electronic medical record data may include, for example, at least one of Activities of Daily Living (ADL), a nursing plan, and a nursing progress chart, and at least one of a clinical pass and a pass status. Further, the electronic medical record data may include information directly indicating the use of the medical device as described above, and may include information indicating how many days after processing such as surgery, information indicating the severity, information indicating the judgment of a doctor, and the like. However, the electronic medical record data is not limited to including all of the above-described items, and may include only a part thereof, and may further include additional items. In particular, in order to suppress a decrease in prediction accuracy due to pseudo-correlation or the like, items of information to be included as electronic medical record data can be added/deleted as appropriate according to a judgment of a person who performs model construction or the like.

Further, as described above, the electronic medical record data to be included in the first learning data and the electronic medical record data to be input at the time of prediction may include information indicating that a medical staffsuch as a doctor or a nurse has determined the use of the medical device. As a result, the host management device 10 can more accurately predict the end-of-use time of the medical device in advance in consideration of the result of the medical staffs determination of the use of the medical device.

OTHER

Part or all of the processing in the prediction system, the host management device 10, the mobile robot 20, the device lending system 30, the electronic medical record system 40, the learning system 80, and the like described above can be realized as a computer program. Such programs include instructions (or software code) that, when loaded into a computer, cause the computer to perform one or more of the functions described in the embodiments. The program may be stored in a non-transitory computer-readable medium or a tangible storage medium. By way of example, and not limitation, computer-readable media or tangible storage media include random-access memory (RAM), read-only memory (ROM), flash memory, solid-state drive (SSD) or other memory techniques, CD-ROM, digital versatile disk (DVD), Blu-ray disk or other optical disk storage, magnetic cassettes, magnetic tape, magnetic disk storage or other magnetic storage devices. The program may be transmitted on a transitory computer-readable medium or a communication medium. The example of the transitory computer-readable medium or the communication medium includes, but is not limited to, an electrical, optical, acoustic, or other form of propagating signal.

The present disclosure is not limited to the above-described embodiments, and can be appropriately modified without departing from the scope of the present disclosure. Further, the present disclosure includes that each example in the above-described embodiment is appropriately combined and implemented.

For example, although the above-described embodiment mainly describes a system in which a mobile robot autonomously moves in a hospital, the above-described transport system is not limited to a medical device, and can transport an article including a device to be lent as a package in a hotel, a restaurant, an office building, an event hall, or a complex facility. That is, the transport system according to the above-described embodiment can be used for recovery of a lending device other than a medical device. In addition, although the description has been given on the assumption that the device is transported in one facility, the present disclosure can be similarly applied to transportation between a plurality of facilities as long as the mobile robot is a mobile robot that can be transported between a plurality of facilities.

In addition, the above-described transport system is not limited to the case of using the mobile robot 20 described as an example, and a mobile robot having various configurations may be used instead of or in addition to the mobile robot. In addition, although the above-described transport system exemplifies a mobile robot capable of autonomous movement, the transport system can be constructed as a system for transporting a conveyed object by using a mobile robot controlled by remote control by an operator, and in this case, information indicating the operator may be included in the learning data, and the operator may also be determined when determining the mobile robot.

What is claimed is:

1. A transport system for transporting and collecting medical devices by a mobile robot in a device rental system, the transport system comprising:

a first trained model that has been trained, using first training data including:

(i) rental performance data representing a use history of a medical device rented in the device rental system and including a record of an end time at which use of the medical device has ended, and (ii) electronic medical record data describing a patient's symptoms, treatment contents, and treatment schedules, to output, based on the electronic medical record data and data indicating the medical device currently loaned out, a predicted end time of use of the medical device;

a second trained model that has been trained, using second training data including:

(i) collection performance data including a use end time and a collection-completion time of the medical device collected by the mobile robot, and (ii) route data indicating a collection route executed by the mobile robot, to output a collection route for collecting the medical device as a return item by the mobile robot based on the predicted end time output from the first trained model;

a controller configured to:

input the electronic medical record data of a respective patient and the data indicating the medical device currently loaned out to the respective patient, into the first trained model to acquire the predicted end time of use of the medical device currently loaned out to the respective patient;

input the predicted end time that is output from the first trained model into the second trained model to acquire the collection route for collecting the medical device currently loaned out to the respective patient as the return item;

determine the mobile robot that performs a collection operation for the medical device currently loaned out to the respective patient based on the acquired collection route; and control movement of the determined mobile robot to perform the collection operation via the acquired collection route.

2. The transport system according to claim 1, wherein:

the collection performance data includes first information that is at least one of a time required by the mobile robot to perform the collection, a moving distance of the mobile robot, and power consumption of the mobile robot; and the second trained model is a model that has undergone machine learning so as to output the collection route that minimizes the first information.

3. The transport system according to claim 2, wherein the second trained model outputs the collection route that minimizes the first information, when a collectable time at a collection point for the medical device is within a predetermined time.

4. A transport control method for a computer to perform transport control for transporting and collecting medical devices by a mobile robot in a device rental system, the transport control method comprising:

storing a first trained model that has been trained, using first training data including:

(i) rental performance data representing a use history of a medical device rented in the device rental system and including a record of an end time at which use of the medical device has ended, and (ii) electronic medical record data describing a patient's symptoms, treatment contents, and treatment schedules, to output, based on the electronic medical record data and data indicating the medical device currently loaned out, a predicted end time of use of the medical device;

storing a second trained model that has been trained, using second training data including:

(i) collection performance data including a use end time and a collection-completion time of the medical device collected by the mobile robot, and (ii) route data indicating a collection route executed by the mobile robot, to output a collection route for collecting the medical device as a return item by the mobile robot based on the predicted end time output from the first trained model;

inputting the electronic medical record data of a respective patient and the data indicating the medical device currently loaned out to the respective patient, into the first trained model;

acquiring the predicted end time of use of the medical device currently loaned out to the respective patient from the first trained model;

inputting the predicted end time that is output from the first trained model into the second trained model;

acquiring the collection route for collecting the medical device currently loaned out to the respective patient as the return item, from the second trained model;

determining, by the computer, the mobile robot that performs a collection operation for the medical device currently loaned out to the respective patient based on the acquired collection route; and controlling movement of the determined mobile robot to perform the collection operation via the acquired collection route.

5. The transport control method according to claim 4, wherein:

the collection performance data includes first information that is at least one of a time required by the mobile robot to perform the collection, a moving distance of the mobile robot, and power consumption of the mobile robot; and the second trained model is a model that has undergone machine learning so as to output the collection route that minimizes the first information.

6. The transport control method according to claim 5, wherein the second trained model outputs the collection route that minimizes the first information, when a collectable time at a collection point for the medical device is within a predetermined time.

7. A non-transitory storage medium storing a program causing a computer to execute transport control for transporting and collecting medical devices by a mobile robot in a device rental system, wherein the transport control includes:

storing a first trained model that has been trained, using first training data including:

(i) rental performance data representing a use history of a medical device rented in the device rental system and including a record of an end time at which use of the medical device has ended, and (ii) electronic medical record data describing a patient's symptoms, treatment contents, and treatment schedules, to output, based on the electronic medical record data and data indicating the medical device currently loaned out, a predicted end time of use of the medical device;

storing a second trained model that has been trained, using second training data including:

(i) collection performance data including a use end time and a collection-completion time of the medical device collected by the mobile robot, and (ii) route data indicating a collection route executed by the mobile robot, to output a collection route for collecting the medical device as a return item by the mobile robot based on the predicted end time output from the first trained model;

inputting the electronic medical record data of a respective patient and the data indicating the medical device currently loaned out to the respective patient, into the first trained model;

acquiring the predicted end time of use of the medical device currently loaned out to the respective patient from the first trained model;

inputting the predicted end time that is output from the first trained model into the second trained model;

acquiring the collection route for collecting the medical device currently loaned out to the respective patient as the return item, from the second trained model;

determining the mobile robot that performs a collection operation for the medical device currently loaned out to the respective patient based on the acquired collection route; and controlling movement of the determined mobile robot to perform the collection operation via the acquired collection route.

8. The non-transitory storage medium according to claim 7, wherein:

the collection performance data includes first information that is at least one of a time required by the mobile robot to perform the collection, a moving distance of the mobile robot, and power consumption of the mobile robot; and the second trained model is a model that has undergone machine learning so as to output the collection route that minimizes the first information.

9. The non-transitory storage medium according to claim 8, wherein the second trained model outputs the collection route that minimizes the first information, when a collectable time at a collection point for the medical device is within a predetermined time.

10. The transport system according to claim 1, wherein the transport system is configured to determine the mobile robot with a lower deterioration degree to perform the collection operation than a mobile robot with a higher deterioration degree among a plurality of mobile robots.

11. The transport system according to claim 10, wherein the transport system is configured to determine the mobile robot with the lower deterioration degree to perform the collection operation to equalize the degree of deterioration among the plurality of mobile robots.

12. The transport system according to claim 1, wherein the collection performance data includes a stay time defined as a difference between the use-end time and the collection-completion time, and the second trained model is trained to output the collection route that minimizes, according to a predetermined evaluation function, at least one of the stay time, a travel time of the mobile robot, a travel distance of the mobile robot, and power consumption of the mobile robot.

13. The transport system according to claim 1, further comprising robot information including a degree of deterioration representing a cumulative travel distance or cumulative operating time of each mobile robot, wherein the controller is configured to select the mobile robot that performs the collection operation such that variation of the degree of deterioration among a fleet of mobile robots falls within a predetermined range.

14. The transport system according to claim 1, wherein the electronic medical record data of the respective patient includes explanation of necessity of use of the medical device currently loaned out to the respective patient.

15. The transport system according to claim 12, wherein the second trained model is trained to output the collection route that minimizes the stay time.

* * * * *